(12) United States Patent
Perin

(10) Patent No.: US 7,656,051 B2
(45) Date of Patent: Feb. 2, 2010

(54) BUOYANCY VEHICLE APPARATUS TO CREATE ELECTRICAL POWER

(75) Inventor: James C. Perin, Orange Park, FL (US)

(73) Assignee: James Perin, Orange Park, FL (US)

( * ) Notice: Subject to any disclaimer, the term of this patent is extended or adjusted under 35 U.S.C. 154(b) by 10 days.

(21) Appl. No.: 12/026,468

(22) Filed: Feb. 5, 2008

(65) Prior Publication Data

US 2008/0246283 A1    Oct. 9, 2008

Related U.S. Application Data

(60) Provisional application No. 61/001,446, filed on Nov. 2, 2007, provisional application No. 60/899,334, filed on Feb. 5, 2007.

(51) Int. Cl.
*F03B 13/00*    (2006.01)
(52) U.S. Cl. ............... 290/43; 290/53; 290/44; 290/55
(58) Field of Classification Search ............ 290/53, 290/42, 43, 54, 55
See application file for complete search history.

(56) References Cited

U.S. PATENT DOCUMENTS

| | | |
|---|---|---|
| 155,328 A | 9/1874 | Middleton |
| 272,656 A | 2/1883 | Cook |
| 1,058,785 A | 4/1913 | Nevers |
| 2,470,312 A | 5/1949 | Levin |
| 2,470,313 A | 5/1949 | Levin |
| 3,934,964 A | 1/1976 | Diamond |
| 4,083,186 A | 4/1978 | Jackson, Sr. |
| 4,084,375 A | 4/1978 | Horvath |
| 4,208,875 A | 6/1980 | Tsubota |
| 4,355,513 A | 10/1982 | Girden |
| 4,407,130 A | 10/1983 | Jackson |
| 4,674,281 A | 6/1987 | Kim et al. |
| 4,726,188 A | 2/1988 | Woolfolk |
| 4,868,408 A | 9/1989 | Hesh |
| 5,685,147 A | 11/1997 | Brassea |
| 5,921,082 A | 7/1999 | Berling |
| 6,018,947 A | 2/2000 | Demarco et al. |
| 6,531,788 B2 | 3/2003 | Robson |
| 6,756,695 B2 | 6/2004 | Hibbs et al. |
| 6,772,592 B2 * | 8/2004 | Gerber et al. ............ 60/495 |
| 6,981,373 B2 | 1/2006 | Robinson |
| 7,132,758 B2 * | 11/2006 | Rochester et al. ........ 290/43 |
| 7,216,483 B2 | 5/2007 | Takeuchi |
| 7,291,936 B1 | 11/2007 | Robson |
| 7,545,288 B2 * | 6/2009 | Schiek et al. ............ 340/945 |
| 2003/0145589 A1 | 8/2003 | Tillyer |
| 2004/0253097 A1 | 12/2004 | Kao |
| 2005/0247055 A1 | 11/2005 | Abou-Raphael |
| 2006/0168953 A1 | 8/2006 | Carter |
| 2006/0202483 A1 | 9/2006 | Gonzalez |
| 2006/0218917 A1 | 10/2006 | Abou-Raphael |
| 2007/0022935 A1 | 2/2007 | Griffith et al. |

* cited by examiner

*Primary Examiner*—Nicholas Ponomarenko
*Assistant Examiner*—Iraj A Mohandesi

(57) ABSTRACT

A buoyancy vehicle apparatus includes a water or liquid source, such as a water tank, and a buoyant mass in communication with an electrical generator. The buoyant mass is lifted from a lower level to a higher level to store energy. The mass is stored at the predetermined height and released to travel downward when the electricity is needed. After the mass is released and pulled down by gravity, it will drive the generator to produce electricity. The system can store this energy with no loss in power over a long period of time.

4 Claims, 35 Drawing Sheets

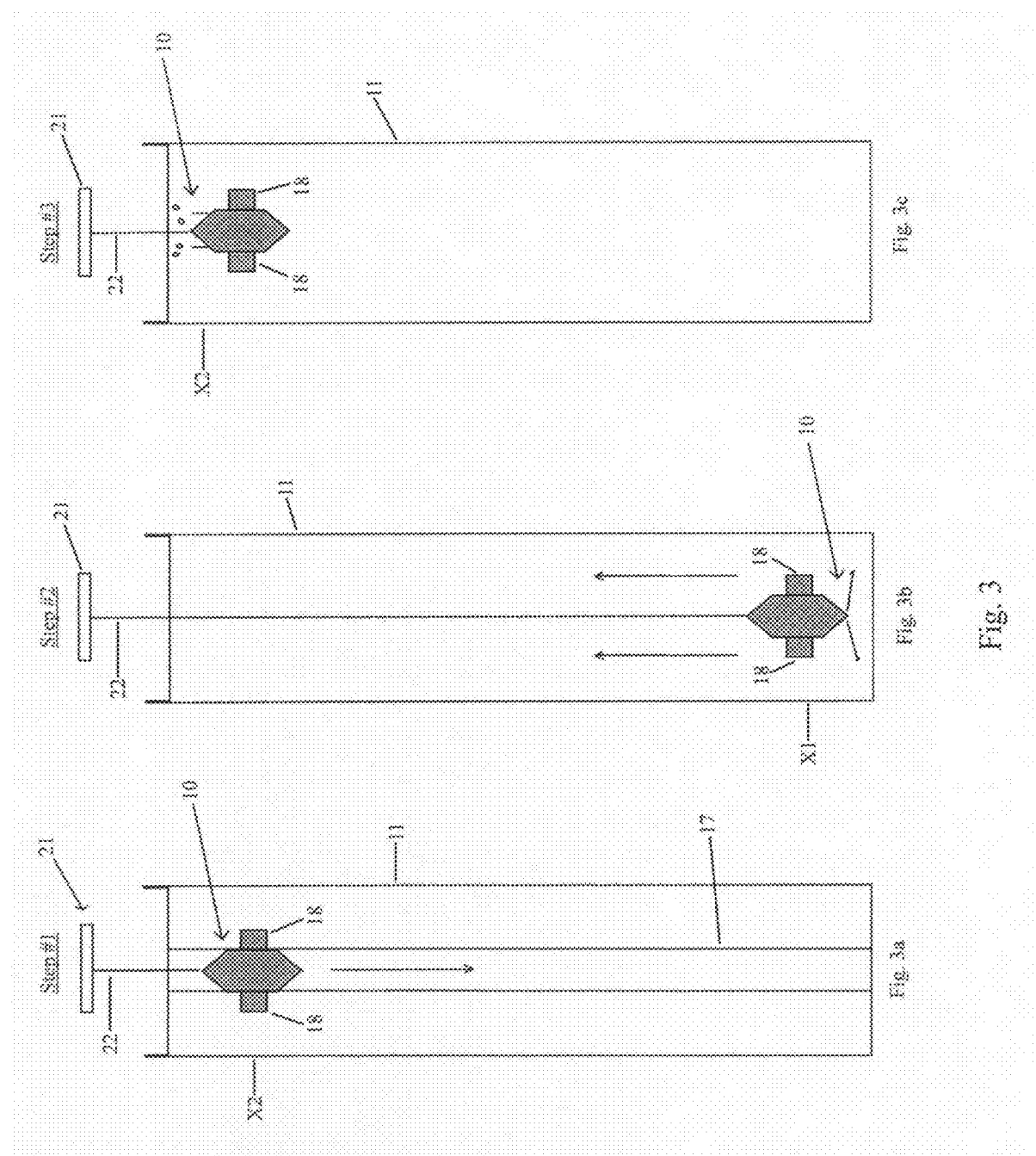

US 7,656,051 B2

BUOYANCY VEHICLE APPARATUS TO CREATE ELECTRICAL POWER

CROSS REFERENCE TO RELATED PATENT APPLICATIONS

This application claims the benefit of priority of U.S. provisional patent application Ser. No. 60/899,334, filed Feb. 5, 2007, and U.S. provisional patent application Ser. No. 61/001,446, filed Nov. 2, 2007, each said application being relied upon and incorporated herein by reference.

BACKGROUND OF THE INVENTION

The market for electricity is continually looking for ways to bring electrical supply and demand together to make their operations more efficient. For example, Utility companies try to maximize and align peak and off-peak supply and demand of energy with the production of energy from power plants. These discrepancies in supply and demand have led to the need for efficient energy storage systems that can level out the differences.

In addition, scientists continually attempt to produce renewable energy sources that are efficient, such as solar energy and wind energy. These sources can produce electricity at sporadically, but often lack the consistent output desired over a period of time. For example, solar energy devices can generate electricity during daylight hours when such light is available, but they have trouble meeting energy demand overnight or during periods when sunlight is not available to the solar cells. Moreover, wind energy produces power only if the wind is blowing, which can make it difficult to control when enough power will be provided to a grid. A reliable energy storage system is desired to stabilize these two renewable energy sources by leveling the energy required for the grid and moving excess energy to a storage facility.

SUMMARY OF THE INVENTION

The buoyancy vehicle apparatus and system for using is a way to store energy in bulk that can then be discharged at a later time. By using a water or liquid source, such as a water tank, and a buoyant mass, the system can lift heavy objects or masses from ground level to a height above the ground to store energy. The masses are stored at a height above the ground and released when the electricity is needed. As the masses are released and pulled down by gravity, they turn generators that produce electricity. The system can store this energy with no loss in power over a long period of time. The system itself is completely "green" because there are no harmful elements used only water and gravity.

DESCRIPTION OF THE DRAWINGS

FIGS. 3a-3c are a side schematic views illustrating three steps of operation of the apparatus through one cycle;

DESCRIPTION OF THE INVENTION

Figure 1:
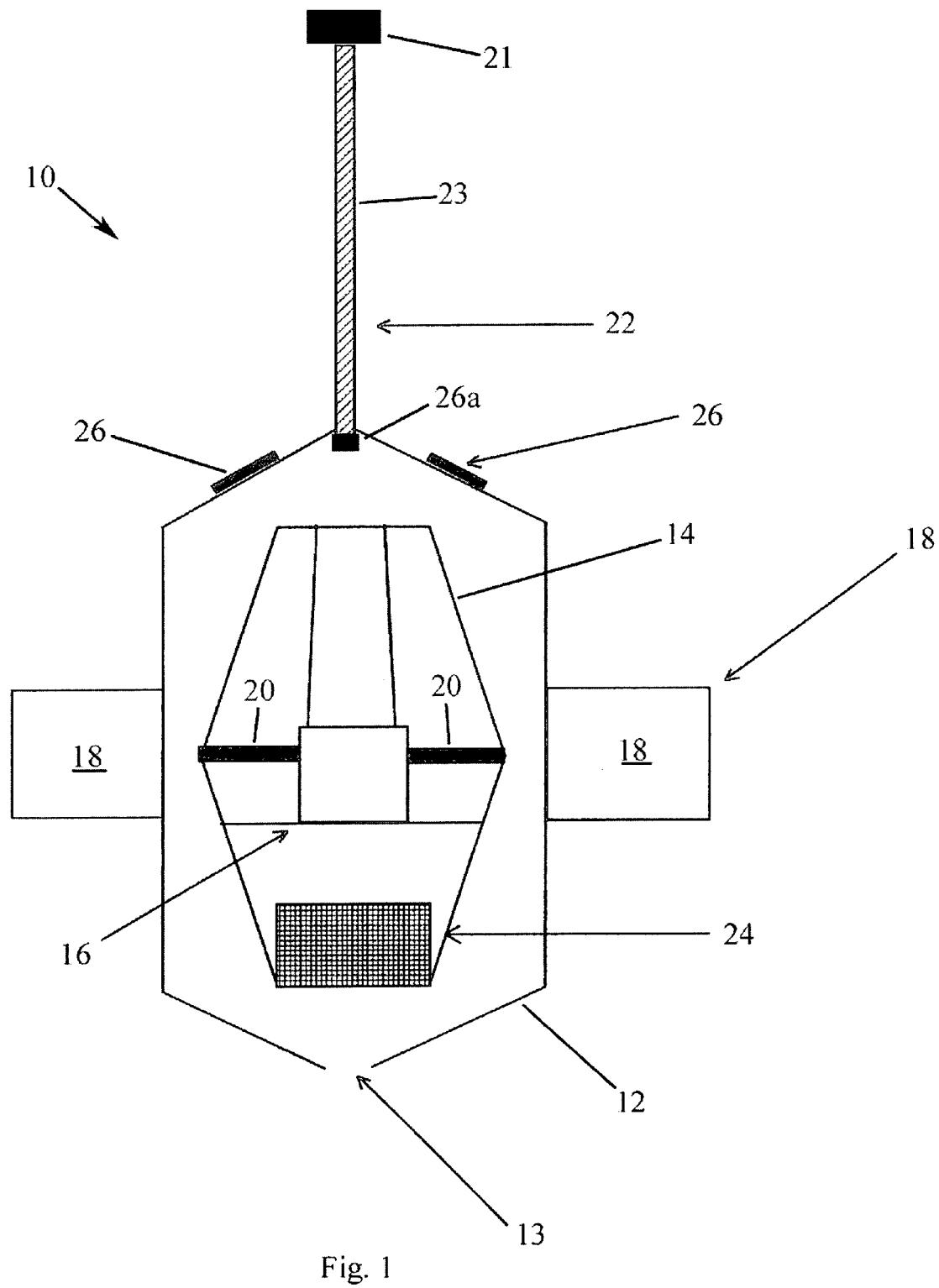
FIG. 1 is a schematic diagram of a first embodiment of a buoyancy vehicle apparatus.
Figure 3D:
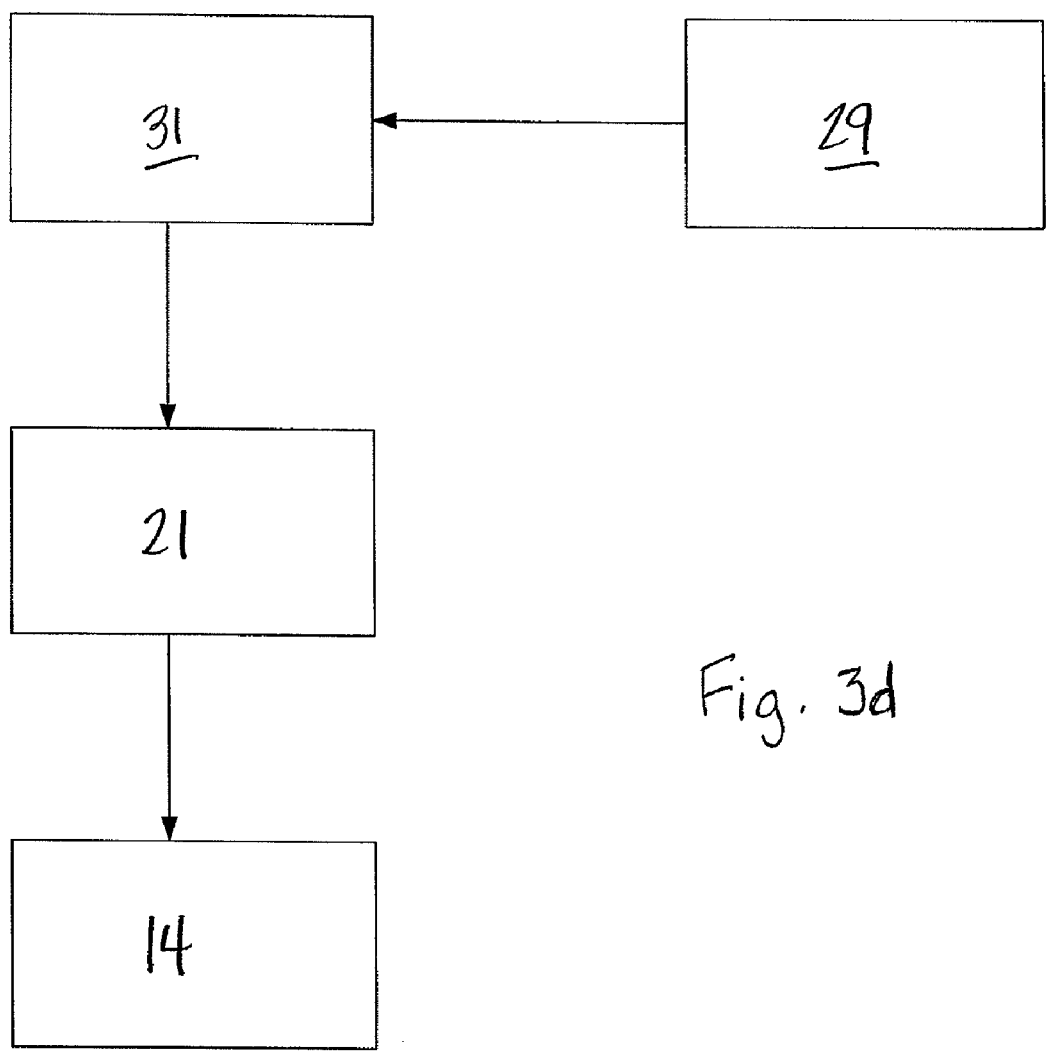
FIG. 3d is a block diagram of an automated embodiment of the apparatus.

A buoyancy vehicle apparatus 10 that creates electrical power from the movement of the apparatus 10 through a fluid as the apparatus 10 cycles negative buoyancy to positive buoyancy is illustrated in the attached figures. In particular, a first embodiment is illustrated in FIG. 1. The apparatus 10 is positioned relative to a collection of the fluid, such as a water in a water tank 11, as shown in FIG. 3. The apparatus 10 has an outer housing 12 that surrounds an interior, air-filled housing or ballast 14. One or more generators 16 are positioned in the interior housing 14, with each generator 16 connected to an driving or agitating mechanism, such as a propeller having blades or a turbine 18, via a shaft or axle 19. The design of each generator 16 is known to persons having ordinary skill in the art, and typically includes a simple device that includes an armature to move a magnet near a wire to create a steady flow of electrons. That is, the generator 16 converts mechanical energy into electricity to serve as a power source. The propellers or turbines 18 are attached to a ballast system 14 to rotate axles 20 connected to the generator 16 so that the generator 16 will in turn create the desired electrical current. An air hose 22 is further included with the apparatus 10, with one end of the air hose 22 connected to the interior housing 14 and the opposite end connected to an air supply 21, such as a conventional air compressor or a pump. Electrical wiring 23 may be coupled with the air hose 22, with the electrical wiring 23 additionally connected to the generator 16.

With the embodiment illustrated in FIG. 1, the apparatus 10 will go through a cycle in the tank 11 to generate the desired electricity, with the steps of the cycle shown in FIG. 3. In particular, the apparatus 10 will initially be positioned in the tank 11 at a level X2 at the start of the cycle, which could further be above the water, and have negative buoyancy from mass in the ballast system 14. That is, the apparatus 10 will have a predetermined weight, including the various components of the apparatus 10 (i.e., generator 16, propellers 18, etc.), and may additionally include one or more weights 24 positioned in the outer housing 12, as well as water that enters the outer housing 12 of the apparatus 10 at a lower water port 13, to create negative buoyancy for descent of the mass.

As the apparatus 10 travels downwardly in the tank 11 from the pull of gravity, it may be guided in the water tank 11 with the use of guide wires 17 that may be connected to the outside of the housing 12 (connected by arms to the housing 12) or to the inside of the housing 12 (connected near the generator) attached to the ballast system 14. Likewise, other guides could be implemented to direct the past of the apparatus 10 in the liquid, such as designing the apparatus 10 to be large enough in the tank 11 that the tank 11 keeps the apparatus on a track that cannot be deviated from, thus eliminating friction with the guide wire. When the mass of the apparatus 10 begins its descent in the water tank 11, the blades of the propellers 18 connected to the apparatus 10 will begin to rotate from the force of the water on the blades of the apparatus 10. The rotating propellers 18 are connected to one or more generators 16 that are mounted to the housing 14, such that the rotation of the propellers 18 will generate the electrical current in the apparatus 10 to be conducted to the desired location via the electrical wiring 23.

Continuing to view FIG. 3, as the apparatus 10 reaches the bottom of the tank 11 (at position X1), air is pumped into the ballast or interior housing 14 of the apparatus 10 through via the air hose 22, which will change the buoyancy of the apparatus 10 to positive. It is to be noted that the air may be forced directly into the housing 12, or the ballast 14 may include a flexible, air tight material (such as a rubber balloon or inner tube). Furthermore, this ballast 14 may be positioned within the housing 12 or attached outside of the housing 12, as desired by the user. After air is forced into to the ballast or housing 14, the buoyancy of the apparatus 10 will become positive, and the apparatus 10 will begin its ascent to the surface of the water in the tank 11 (position X2). The propellers 18 will once again be rotated to create an electrical current in the generators 16, which is stored in the apparatus 10 as described above or sent to the surface through electrical wiring 23.

The apparatus 10 additionally includes one or more air release valves 26 that are affixed to the uppermost surface of the outer housing 12. As the apparatus 10 reaches the surface of the water in the tank 11 and the end of the first cycle, the air release valves 26 will be opened to release the air from the main tank interior housing 14, which is replaced by water through port 13 and once again creates negative buoyancy in the apparatus 10. In one embodiment, the air release valves 26 are ball vales that are opened manually to release air from the interior housing 14. When the apparatus 10 reached the surface, the air release valves 26 would be opened manually and the air would be released, and the air release valves 26 would also be closed manually prior to the apparatus 10 starting its descent. In a variation to the air release valves 26 shown in FIG. 1, a valve 26a, such as a ball valve, may be placed on the air line 22 between the air compressor 21 and the corresponding apparatus 10 to release air from the inner ballast 14 as desired. This would be the same for hydrogen and oxygen gas produced from electrolysis, but it would be released into a tank for later use.

The system may also have an upgrade so that the air release valve 26 is automatic, such that when the apparatus 10 reaches the upper surface at position X2, it will trip a trigger sensor that opens the air release valves 26. When the apparatus 10 achieves a negative buoyancy, the trigger is tripped again and the air release valve 26 is shut. Consequently, the apparatus 10 will descend again in the tank 11 to start a new cycle of electrical current generation.

In general, there are two ways of using the electrical current. The first is electrical power generation. At the start of the cycle, the apparatus 10 is placed in the water tank 11. Negative buoyancy starts the apparatus 10 descending in the tank 11. As the apparatus 10 descends in the water tank 11, the water will turn the propellers 18 on the side of the ballast system 14, which rotates the armature of the generator 16. The generator 16 then produces the electrical current, which is stored in the apparatus 10 or the electrical current will be conducted via the electrical wires 23 to the surface to a battery or straight to a power grid depending on the end use of the electricity generated. If the system is running DC generators, then the electricity generated would be for battery storage. If the system is running AC generators, then the electricity could be directed directly to the power grid for direct use (of course, ancillary equipment would be needed to perform this operation, such as amplifiers, wave controls, etc).

Figure 2:
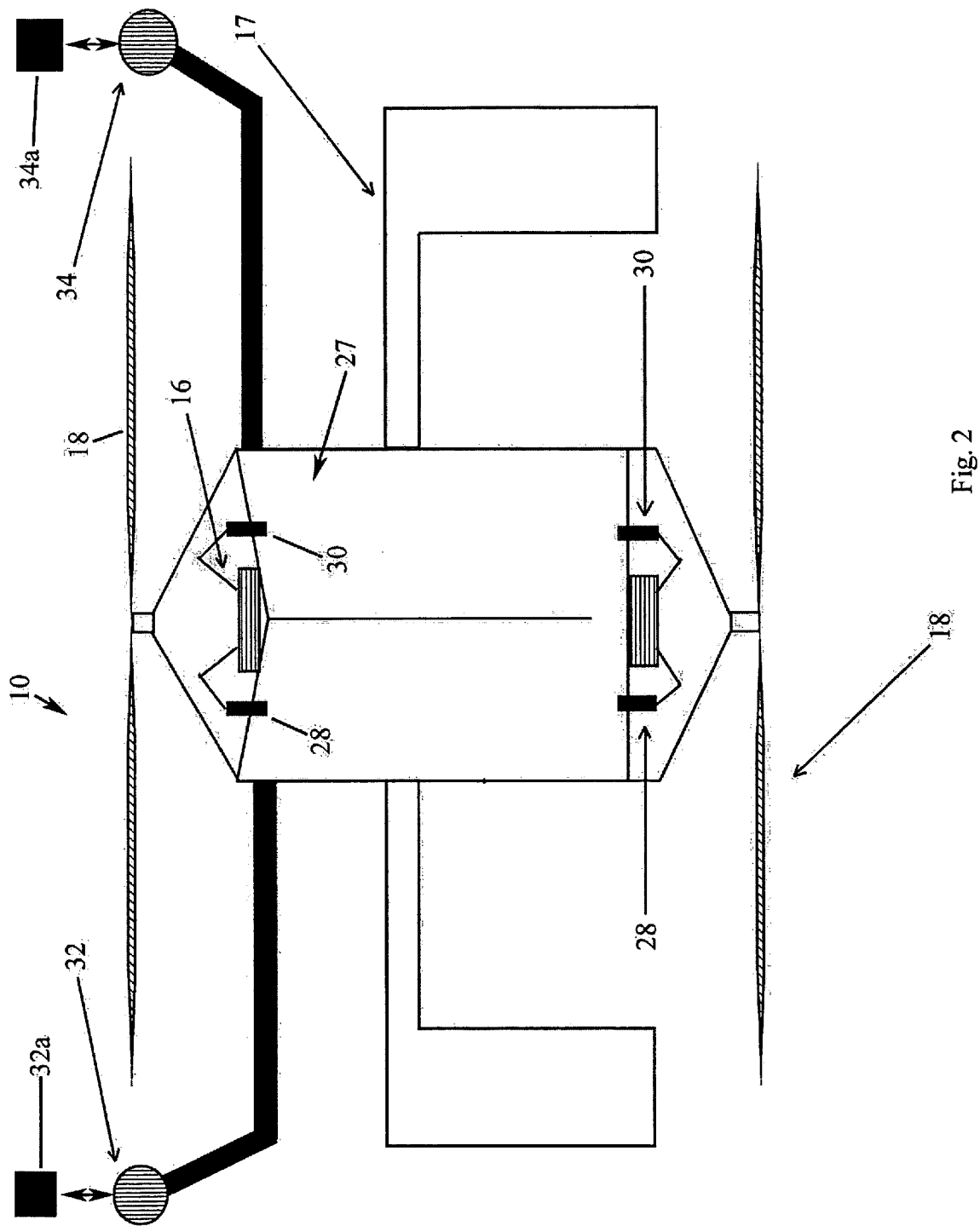
FIG. 2 is a schematic diagram of a second embodiment of the apparatus employing electrolysis.

A second way of using the electrical current is electrolysis in the apparatus 10, as illustrated in the embodiment shown in FIG. 2. That is, another means of using the apparatus 10 would be using the electrical current from the generator 16 for electrolysis to change the buoyancy of the apparatus 10. With this process, as the apparatus 10 descends in the tank 11 and an electrical current is created from the propellers 18 turning the generators 16, electrolysis occurs via an electrolyzer 27, i.e., at a cathode 28 and anode 30, of the generators 16. Hydrogen gas will be collected in a hydrogen storage tank 32 and oxygen gas will be collected in a separate oxygen storage tank 34. As the apparatus 10 continues its descent, water is converted from its liquid state to hydrogen and oxygen gas. This changes the buoyancy of the apparatus 10 and the negative buoyancy will become neutral and then positive (as more gas is produced and water is used). The apparatus 10 will then begin its ascent to the surface of water in the tank 11. As the apparatus 10 ascends, the propellers 18 are once again rotating to create hydrogen and oxygen gas, which increase the buoyancy of the apparatus 10. When the apparatus 10 reaches the surface of the water in the tank 11, the gases will be released into surface tanks.

Put another way, this embodiment of the apparatus 10 will collect hydrogen and oxygen gas (stored in positive ballast tanks 32, 34) produced from electrolysis, using the electricity produced from the generator to breakdown the water in the housing 14, which would change the density of water from a liquid to hydrogen and oxygen gas. This will give the apparatus 10 a positive buoyancy. This achieves hydrogen production that could be stored on the apparatus 10 and released at a later time (i.e., when the apparatus 10 rises to the upper surface at position X2). This provides a hydrogen economy that generates hydrogen on demand instead of having to store it. Two storage tanks 32a, 32b are positioned on the surface, the hydrogen ballast tank 32 would connect and release hydrogen gas into a hydrogen storage tank 32a, and the oxygen ballast tank 34 would connect and release oxygen gas into the oxygen storage tank 34a. This embodiment will change the buoyancy of the apparatus 10 back to negative, and the process is cycled indefinitely.

Thus, there are several designs of the apparatus 10 that could be used to produce electrical current. Looking to FIG. 1, a first embodiment of the apparatus 10 is illustrated with generators 16 mounted in an air filled chamber 14. The outer housing 12 acts as a water chamber that surrounds the air filled chamber 14 to be used for buoyancy. The opening 15 on the bottom of the outer housing or water filled chamber 12 allows the water to be forced out as air is pumped into the interior housing 14 and water to rush into the outer housing 12 when air is released, which acts as the main mechanism for buoyancy of the apparatus 10. The air hose 22 supplies the air for the interior chamber 14. The propellers 18 are mounted external to the ballast system 14, which would allow it to capture the flow of water creating an electrical current.

FIG. 2 illustrates the first embodiment of the apparatus 10 with a hydrogen producing apparatus. The propellers 18 are positioned centrally with respect to the vertical axis of the apparatus 10, and the ballast system 14 has been moved lateral to the outer housing 12 or water filled chamber. The generators 16 use the rotational force of the propellers 18 to create an electrical charge that uses the electrolyzer 27 to produce hydrogen and oxygen gas. The gas is stored in two separate tanks 28, 30 as mentioned above.

Referring to FIG. 3, a stepwise demonstration of a single apparatus 10 in a complete cycle is illustrated. At step 1, negative buoyancy at the beginning of the cycle causes the apparatus 10 to descend to the bottom of the tank 11 from the upper position X2. As the apparatus 10 descends in the water in the tank 11, the propellers 18 rotate from the force of the passing water causing the generators 16 to create an electrical charge. At step 2, once the apparatus 10 has reached the bottom of the tank 11 at position X1, air is pumped into the interior housing 14, which forces water out of the bottom port 13 of the ballast tank 14.

Control of the air into the housing 14 may be manual or automated. Using a manual set up, the user would monitor the status of the apparatus 10, and when the apparatus 10 has reached the bottom of the tank 11, the user would trigger operation of the air compressor 21 to fill the interior housing 14 with a gas such as air to increase the buoyancy of the apparatus 10. In an automated embodiment illustrated in the block diagram of FIG. 3d, an electrical or mechanical sensor 29 may be used to notify the user or a central controller 31, such as a computer or microcontroller, connected to the air compressor 21 when the apparatus 10 has reached the lower most level X1 of the tank 11. In such an embodiment, the sensor 29 may be positioned at a predetermined position along the length of the tank 11 so that when the apparatus 10 reaches that position in the tank 11, the apparatus 10 will trigger the sensor 29 and send a corresponding signal. Thus, when the sensor 29 is tripped, the controller 31 would activate the air compressor 21 to fill the ballast 14 with air. The trigger was activated just like the air release trigger at the top of the tank 11, by the motion of the apparatus 10 against the trigger sensor. As the apparatus 10 gains positive buoyancy, it may trip another sensor (or the same sensor a second time), so that the controller 31 will shut off the air compressor 21. When the ballast tank 14 is full of air, the apparatus 10 begins its ascent in the water in the tank 11. During the ascent, the propellers 18 will once again rotate, thereby causing an electrical current to flow. Next, at step 3, when the apparatus 10 reaches the surface of the water, the air in the ballast tank 14 is expelled, and the apparatus 10 descends in the tank 11 again to generate electrical current. The cycle may be repeated indefinitely.

Figure 5:
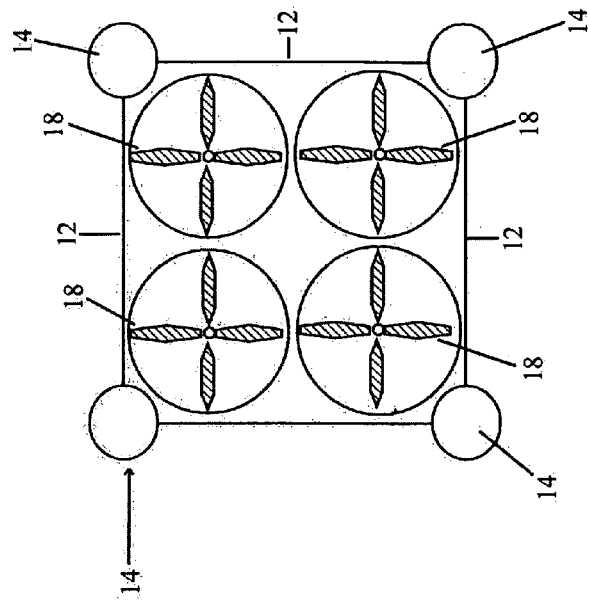
FIG. 5 is a top plan view of the embodiment illustrated in FIG. 4.
Figure 4:
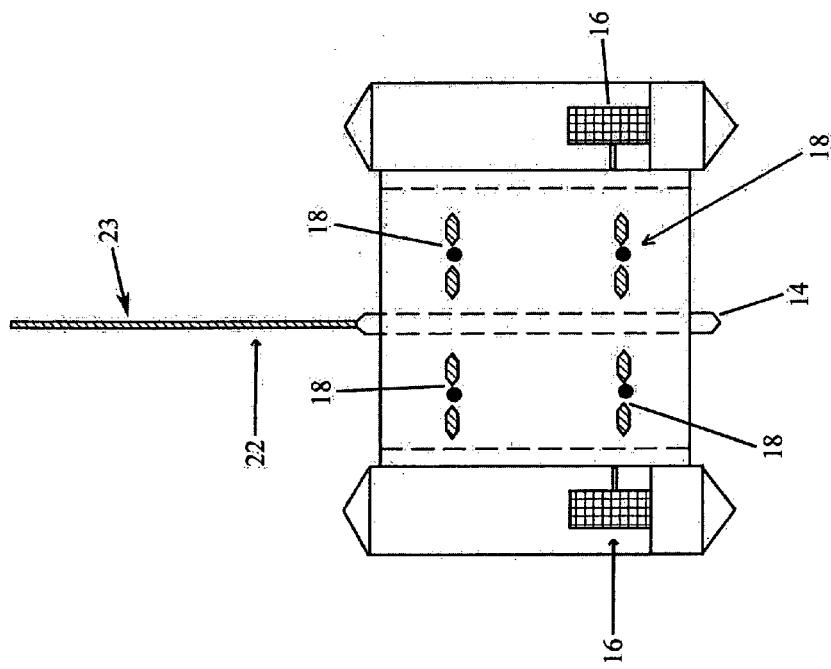
FIG. 4 is side schematic view of another embodiment of the apparatus with propellers being housed inside of the apparatus.

Additional configurations of the apparatus 10 may be implemented as desired. Referring to FIGS. 4 and 5, a schematic is provided showing the use of the propellers 18 inside the apparatus 10 rather than externally. The use of interior propellers 18 could have the advantage of better water flow through the apparatus 10. That is, the user is able to funnel the water to the propeller or turbines 18, thus having a larger amount of water producing force against the propeller 18. Also, this design has the advantage of funneling water, and thus increasing its velocity to the propeller 18 which would increase the force on the propeller 18.

Figure 6:
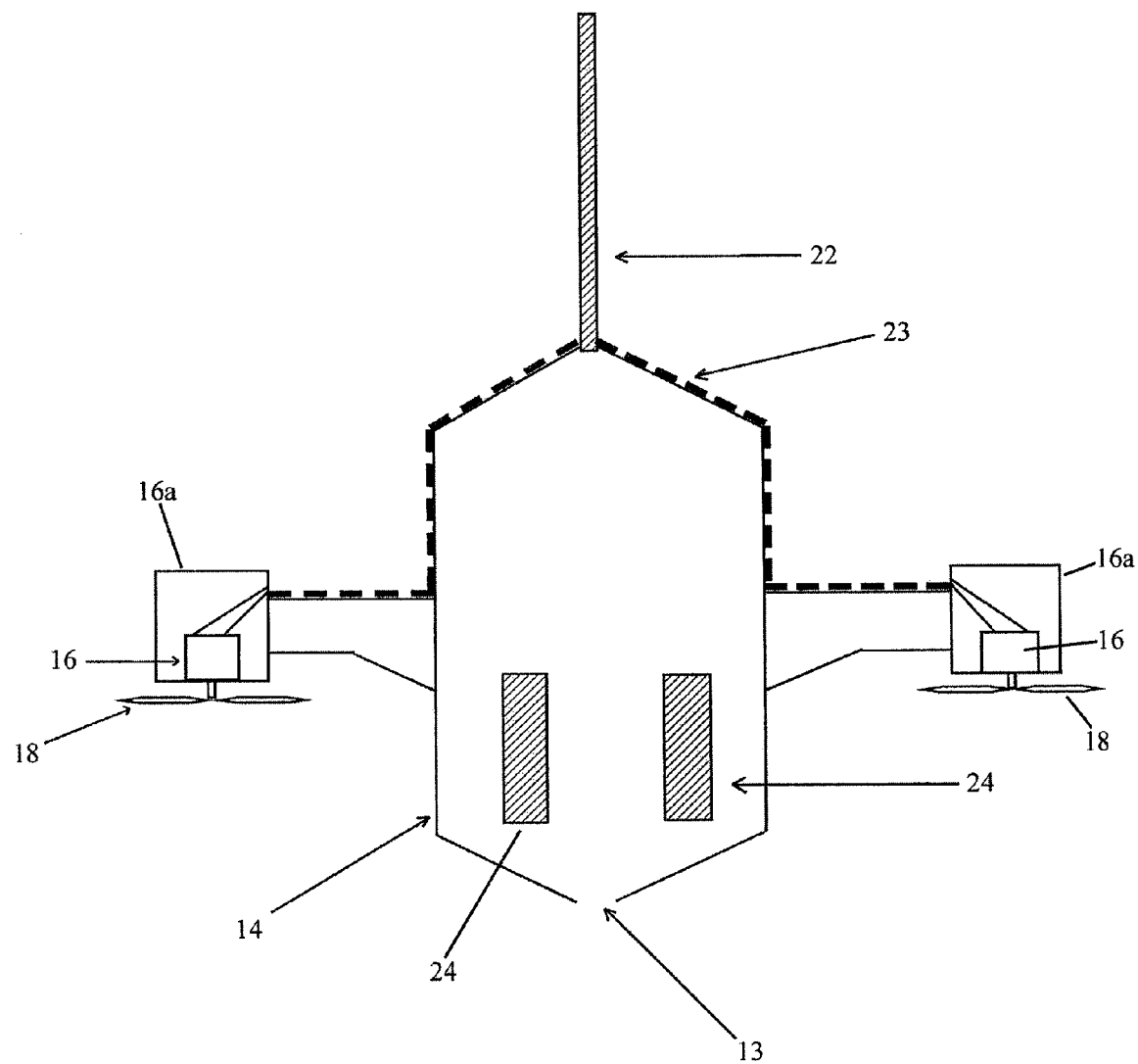
FIG. 6 is a side schematic view of another embodiment of the apparatus with propellers abutting the air tank.
Figure 7:
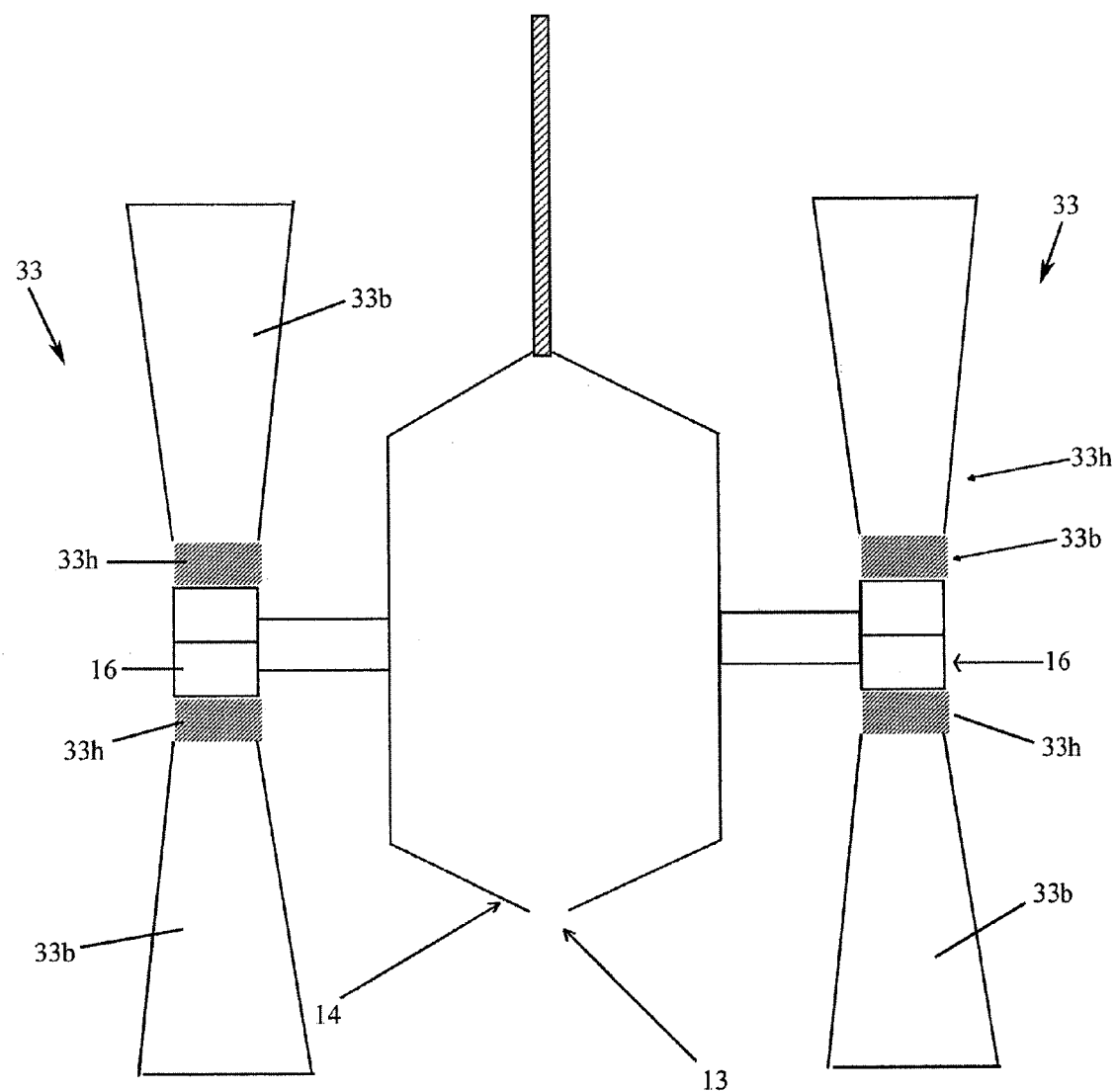
FIG. 7 is a side schematic view of an embodiment of the apparatus using water turbines.

Looking now to FIG. 6, the embodiment is similar to the original design shown in FIG. 1, except the generators 16 are mounted lateral to the ballast tank 14. The benefit to this design is that it is the easiest to build and also the cheapest. However, with respect to the other designs, it is the least efficient because the body and housing 16a for the ballast 14 and generators 16 are big factors in resistance when it comes to water. Another embodiment is illustrated in FIG. 7, in which hydrodynamic turbines 33 are implemented to create the electrical current. The turbines 33 operate similarly to the propellers 18, but more efficient. There are many different kinds of hydro turbines 33 known to a person having ordinary skill in the art that could be used with the present design. The turbine 33 uses a head of water (for a dam, it would be anywhere from 10m to 300 m) that is considered the main source of power. The flow through the turbine 33 determines how much power is produced; that is, the faster the flow the more power produced. Using a head 33h (the funnel in FIG. 7) may be unnecessary for this embodiment because the head 33h in reality is the amount (mass/weight) of water sitting above the turbine 33 and pushing down with gravity on that turbine 33, which in the present embodiment does not matter because the turbine 33 is not moving the water. That is, a turbine 33 having a head 33h and a body 33b is connected to one or more generators 16. In all other respects, the apparatus 10 is similar to the previous designs using propellers 18.

Figure 8:
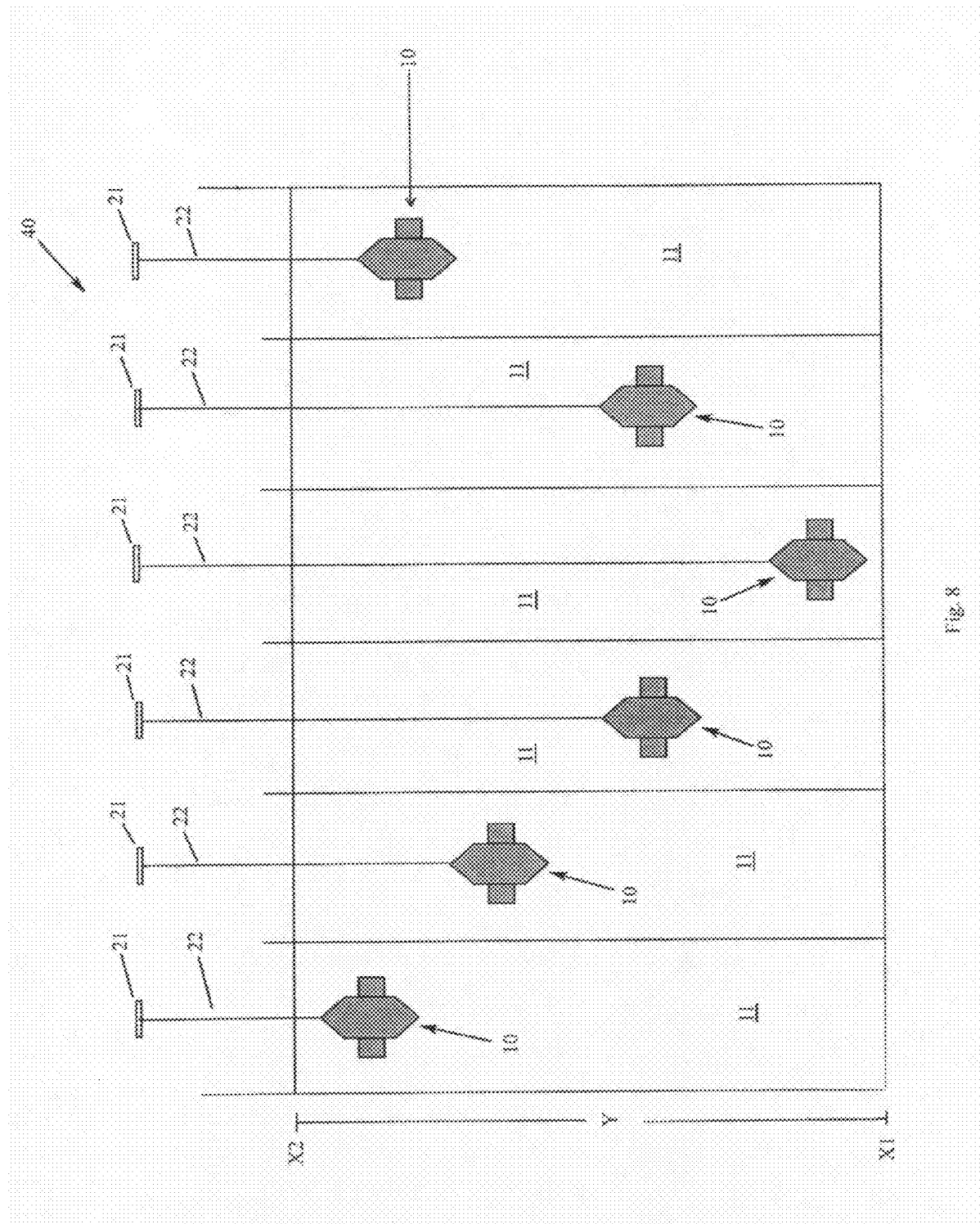
FIG. 8 is a side schematic view of an electrical facility employing multiple apparatuses.

Looking to FIG. 8, a lateral view of an electrical facility 40 using multiple apparatuses 10 for generating electricity is illustrated. In particular, this facility 40 includes six apparatuses 10 to generate electricity, although more or fewer apparatuses 10 may be incorporated as desired by the user. The apparatuses 10 are timed to be at different stages of their descent or ascent at any particular time so that an electrical current is continuously flowing to a central source. This is only to represent the use of multiple apparatuses 10 for electrical power; all other aspects of how the apparatuses 10 work may correspond to one of the embodiments described above.

Figure 9:
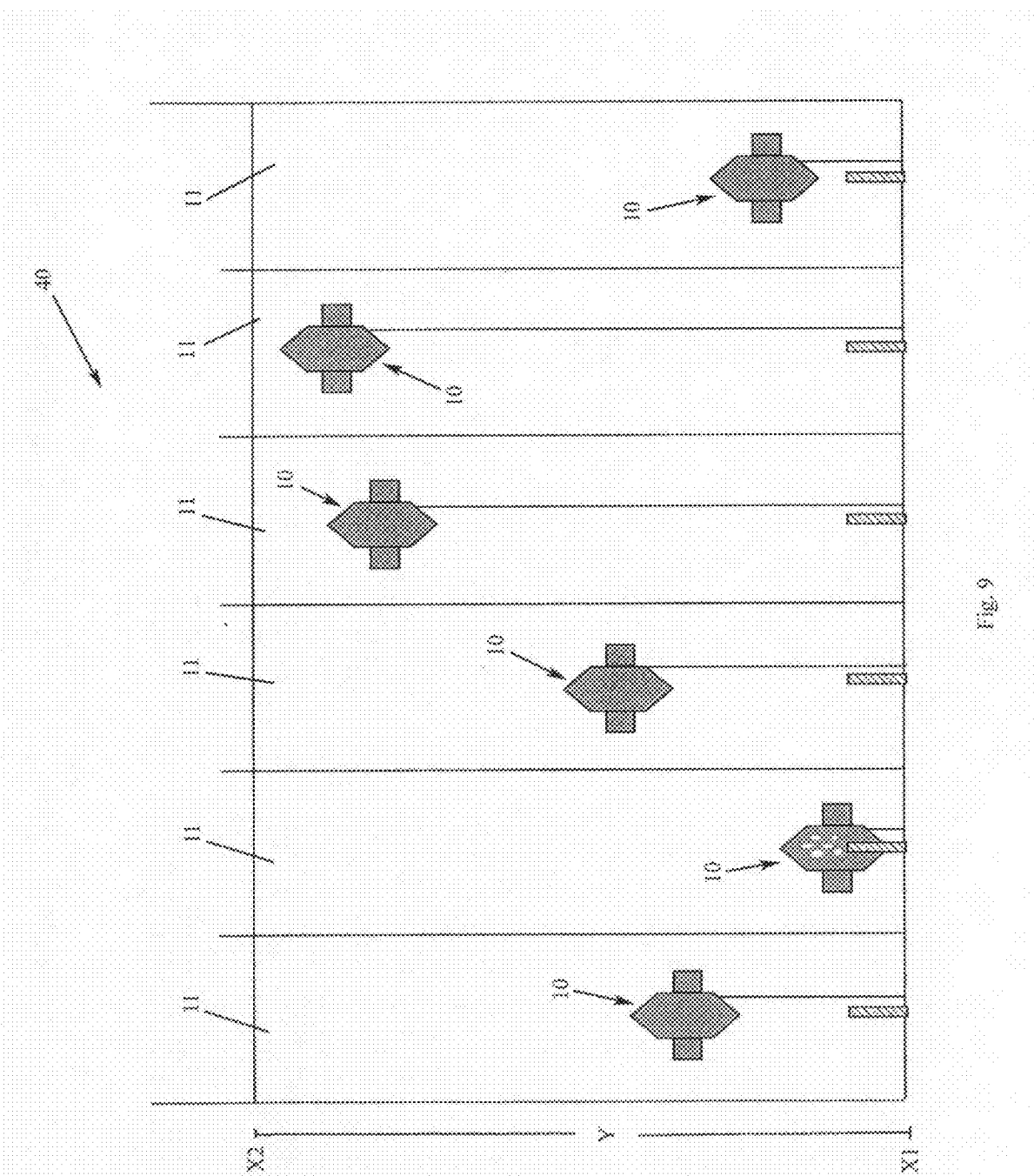
FIG. 9 is a side elevational view of another embodiment of the facility illustrated in FIG. 7.
Figure 10:
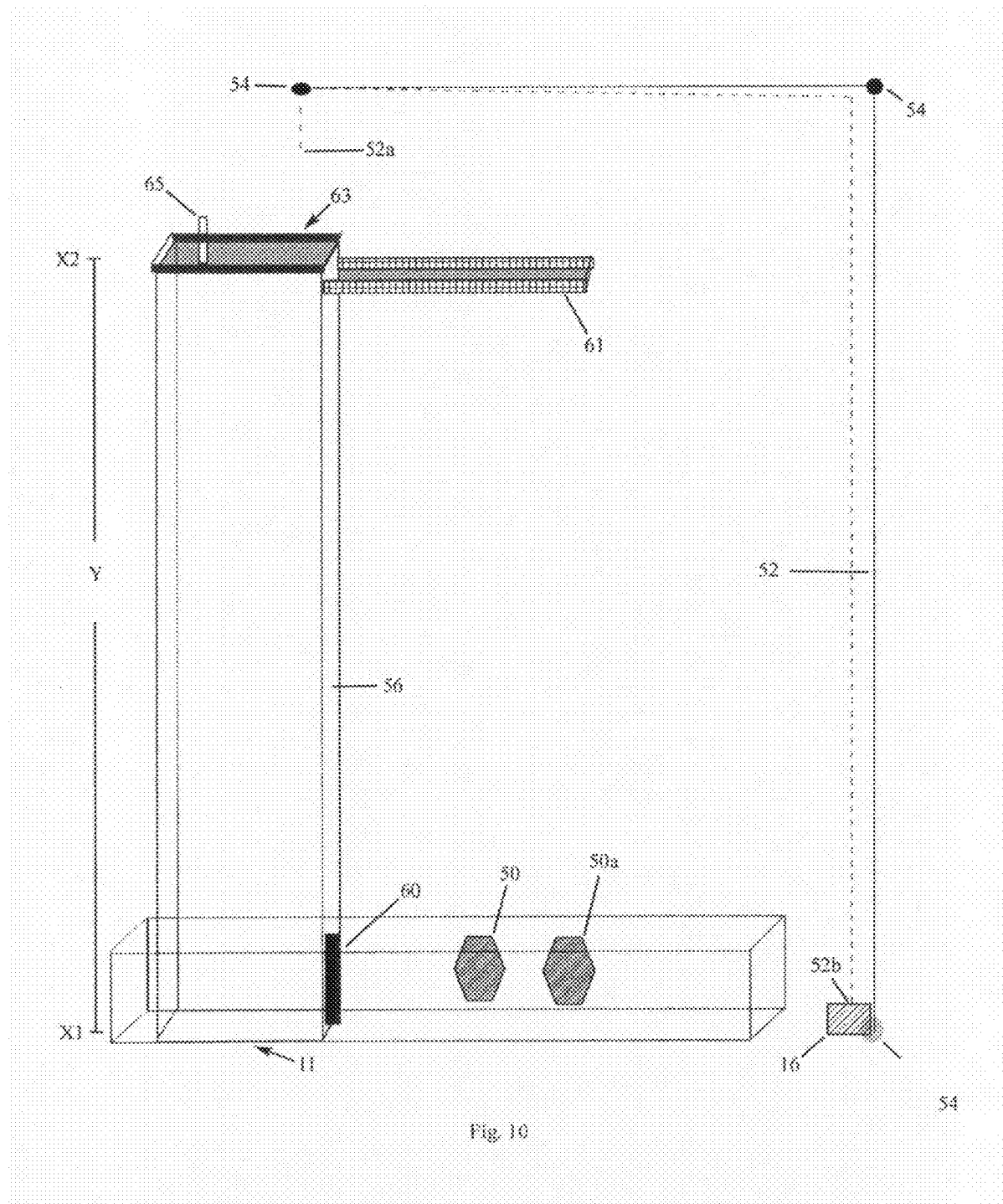
FIGS. 10 through 26 are side elevational views of another embodiment of a system employing an buoyancy vehicle apparatus.

A second embodiment of the facility 40 is illustrated in FIG. 9. In this embodiment, the facility 40 takes advantage of air and electrical wiring coming from the bottom of the tank 11 as opposed to the top of the tank 11 as shown in FIG. 7. Multiple apparatuses 10 are shown functioning as in FIG. 7, but when this embodiment, each apparatus 10 descends to the bottom of the tank 11. Once at the bottom, the air is pumped into the interior housing 14 and then released at the top of the tank 11 as in previous examples. The electrical wire 22 could come out the bottom or top of the outer housing 12, with the user testing the various embodiments to determine which is most efficient.

In operation, it is desired that the generator 16 and propeller 18 will move in the water at the rate of 2 meters/second to provide the desired electrical output. This rate is no problem for this design and is able to produce up to 35 kW per hour. It is estimated that a water tank 11 could be used (in-ground or above ground) that is roughly 20-30 m high and 8 m wide. The compressed air would be stored overnight (during off-peak electricity cost) and released during peak hours to cycle the system.

The design described herein is a way to use that compressed air much more efficiently because water has 800 times the density of air so it produces 800 times the force on the turbine than air does. To give an example, if you take a wind turbine that produces 3 MW of power, it will work with an optimum wind speed of 14 m/s and a propeller diameter of 50 m (roughly a football field and a half). If the same generator was used in the present system, water would need to flow at the rate of 2 m/s and a diameter of 20 m for the propellers. This allows large scale energy storage using compressed air.

Referring to FIGS. 10-26, another embodiment of the system implementing the apparatus 10 is illustrated. In this embodiment, the system designed to take advantage of the first embodiment and making it more efficient. In particular, this embodiment provides a system that uses gravity and buoyancy to lift a buoyant mass 50 from a first, low level X1 (e.g., a ground level) to a higher level X2 above the low level X1. The water tank 11 is designed to raise a positive buoyant mass 50 from the lower level X1 to the higher level X2 giving the mass 50 a potential energy. The mass 50 can then be stored on a platform 61, and, when electricity is needed, the mass 50 is connected to a first end 52a of a rope 52 connected to a pulley assembly 54. The opposite end 52b of the rope 52 is connected to a generator 16, such that when the mass 50 is allowed to fall from the upper level X2 to the ground level X1, it will spin the armature of the generator 16 to produce electricity. While there are multiple designs that can be used to satisfy the criteria of this system illustrated, the key of the system using gravity, buoyancy and a positive buoyant mass is the main idea of this embodiment. There are multiple other uses of the system including but not limited to, rising materials from a lower level X1 to a higher level X2 for removal or storing of the material.

Continuing to refer to FIGS. 10-26, the water tank 11 has a predetermined height Y from level X1 to X2. The water tank can be of any height and raise the buoyant mass to give the buoyant mass potential energy. There are two positive buoyancy masses 50 in the pool of water in the tank 11 at ground level X1. The masses have a positive buoyancy; for example, if they weigh 10 kg, then they will have a volume of air inside that will allow them to be buoyant in water in the tank 11. The masses 50 can vary in weight along with the volume of air needed to raise them in water.

The water tank 11 in this embodiment can be separated into a vertical tower 56 and a horizontal base 58, with an the inlet portal 60 operatively positioned between the vertical tower 56 and the horizontal base 58 of the water tank 11. This inlet portal 60 is closed by an inlet door 59 whenever the upper outlet portal 62 is open so that water is maintained within the water tank 11. This inlet door 59, as well as the other doors described herein, may be closed manually or via a motor connected to the door 59 as known in the art. The level of water in the pool is above the inlet portal 60 so no air can get in or water can get out when the inlet portal 60 is open.

The rope 52 is positioned to hook the mass 50 when it reaches the surface of the water, and acts as a conveyor system having a series of pulleys 54, namely, a vertical conveyor, to lower the mass 50. The rope 52 is also used to connect the mass 50 to the generator 16 when the mass 50 is allowed to fall from the upper level X2, discharging its stored energy. The generator 16 has an armature that is connected to one of the pulleys 54 of the conveyor system, with the pulley or conveyor wheel spinning as the mass 50 is lowered to the ground X1. The pulley is connected to the rope 52, and the conveyor wheel and armature will spin as the mass 50 is allowed to fall from height X2 to height X1 to produce electricity in the generator 16. There is a valve 65 traversing the door 63 at the top of the outlet portal 62 to release the pressure created when the inlet portal 60 is open. The valve 65 may be a ball valve, or similar valve, that is positioned at the top of the water tank 11. The valve 65 moves with the lid 63, and is set up to work as the air release valve from the compressed air system. It is to be noted that the outlet portal 62 is always closed when the inlet portal 60 is open. Finally, the platform 61 is positioned proximate the outlet portal 62 for storing the masses 50 and their corresponding energy.

Figure 11:
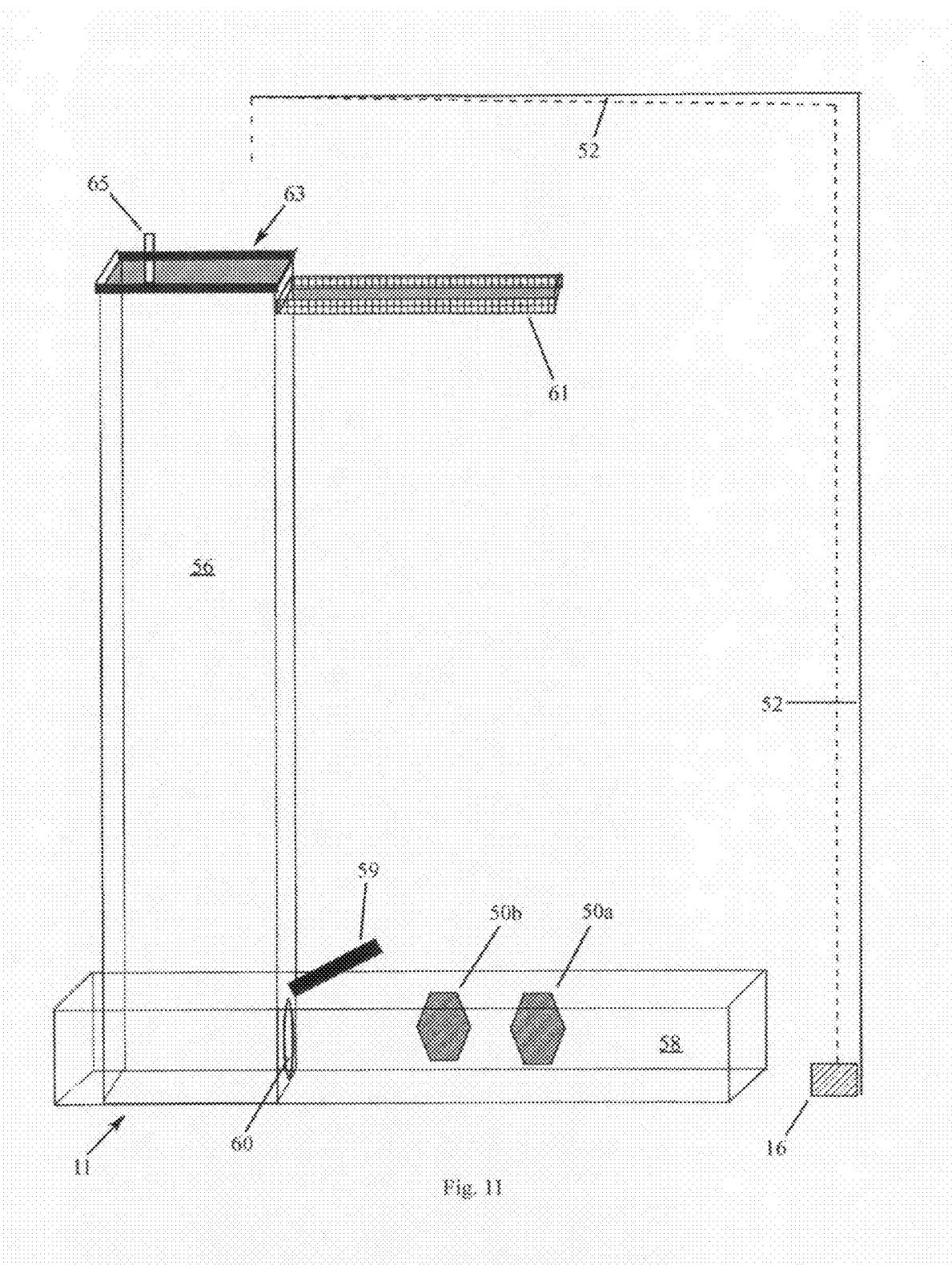
Figure 12:
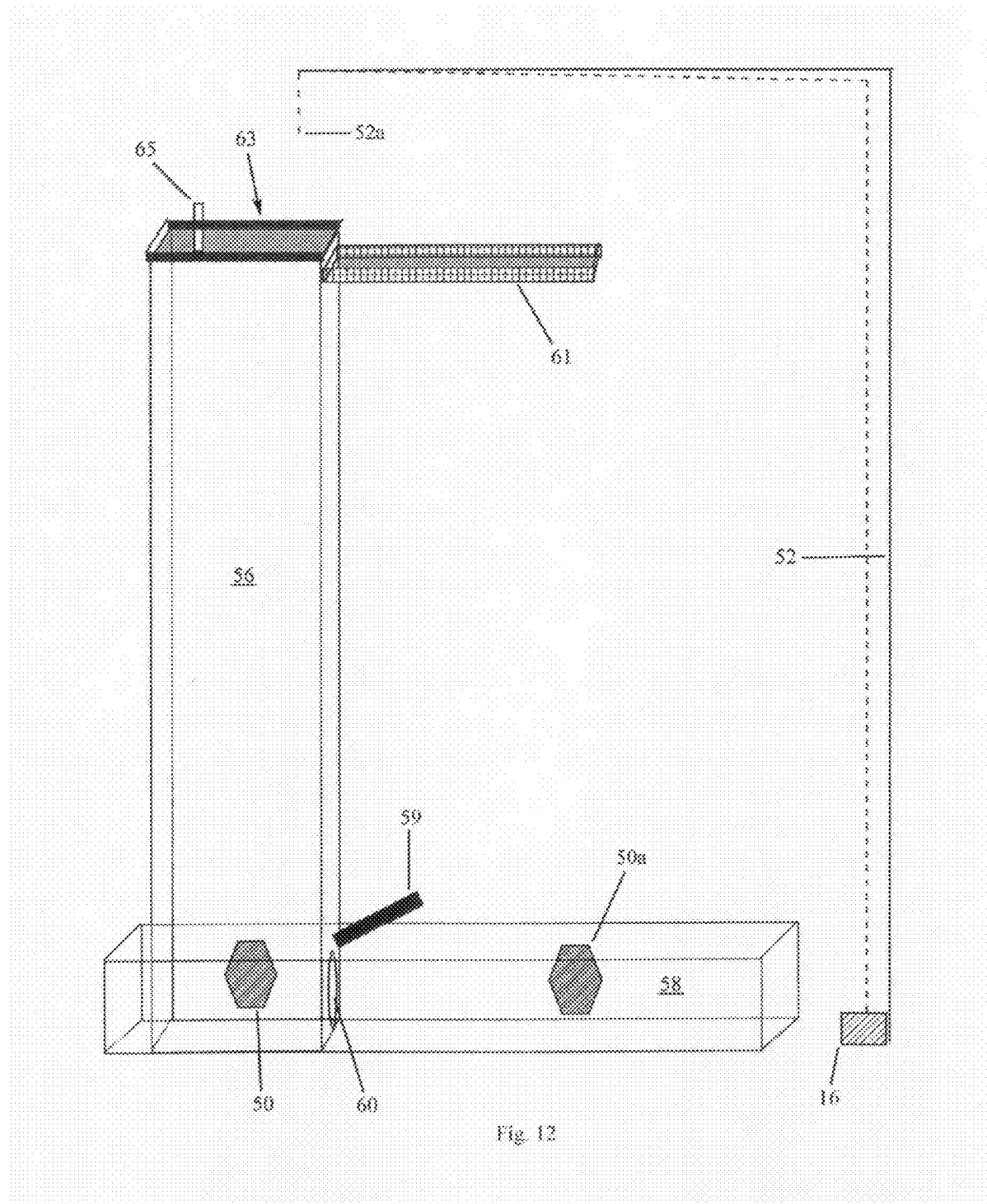
Figure 13:
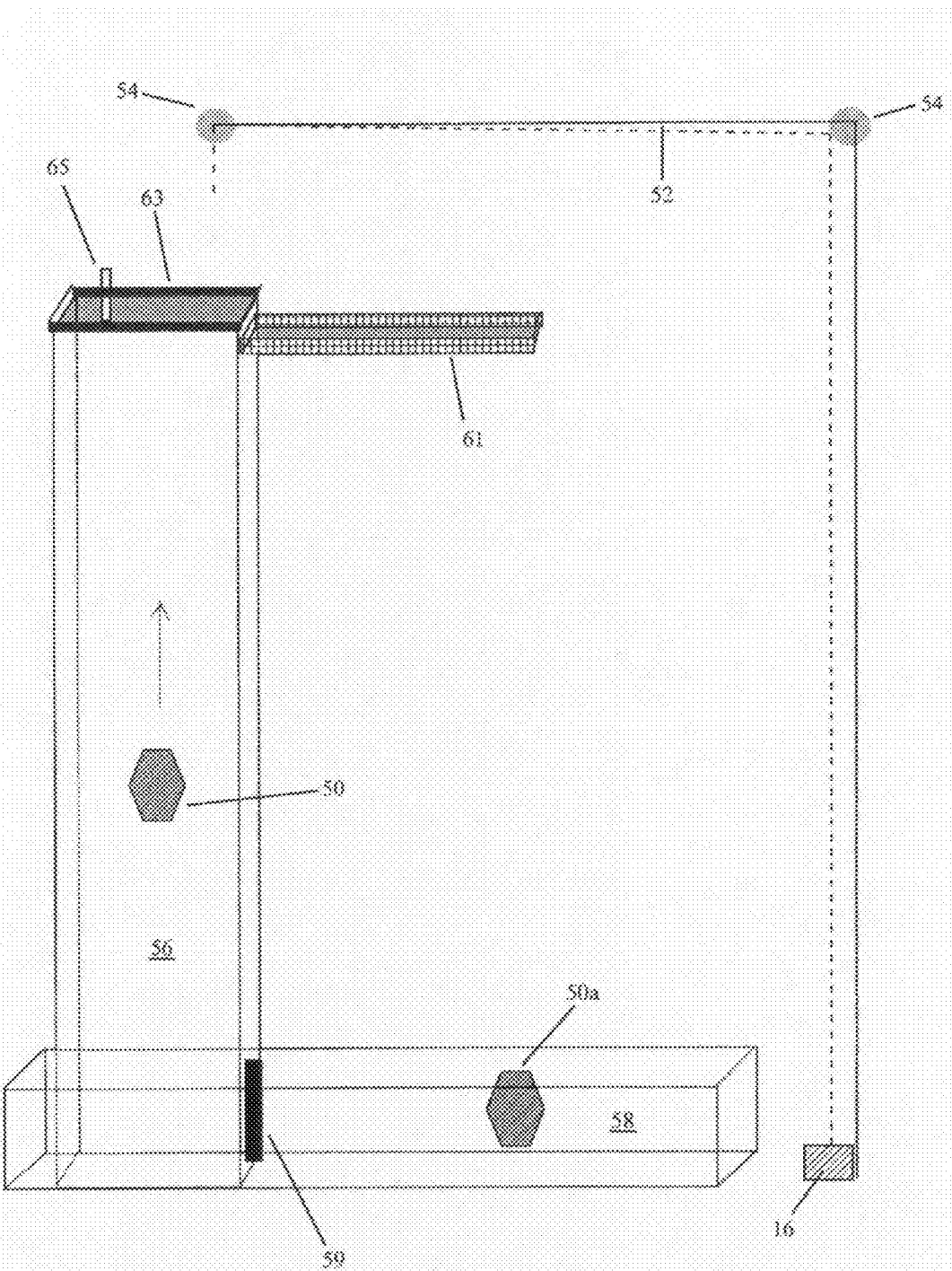
Figure 14:
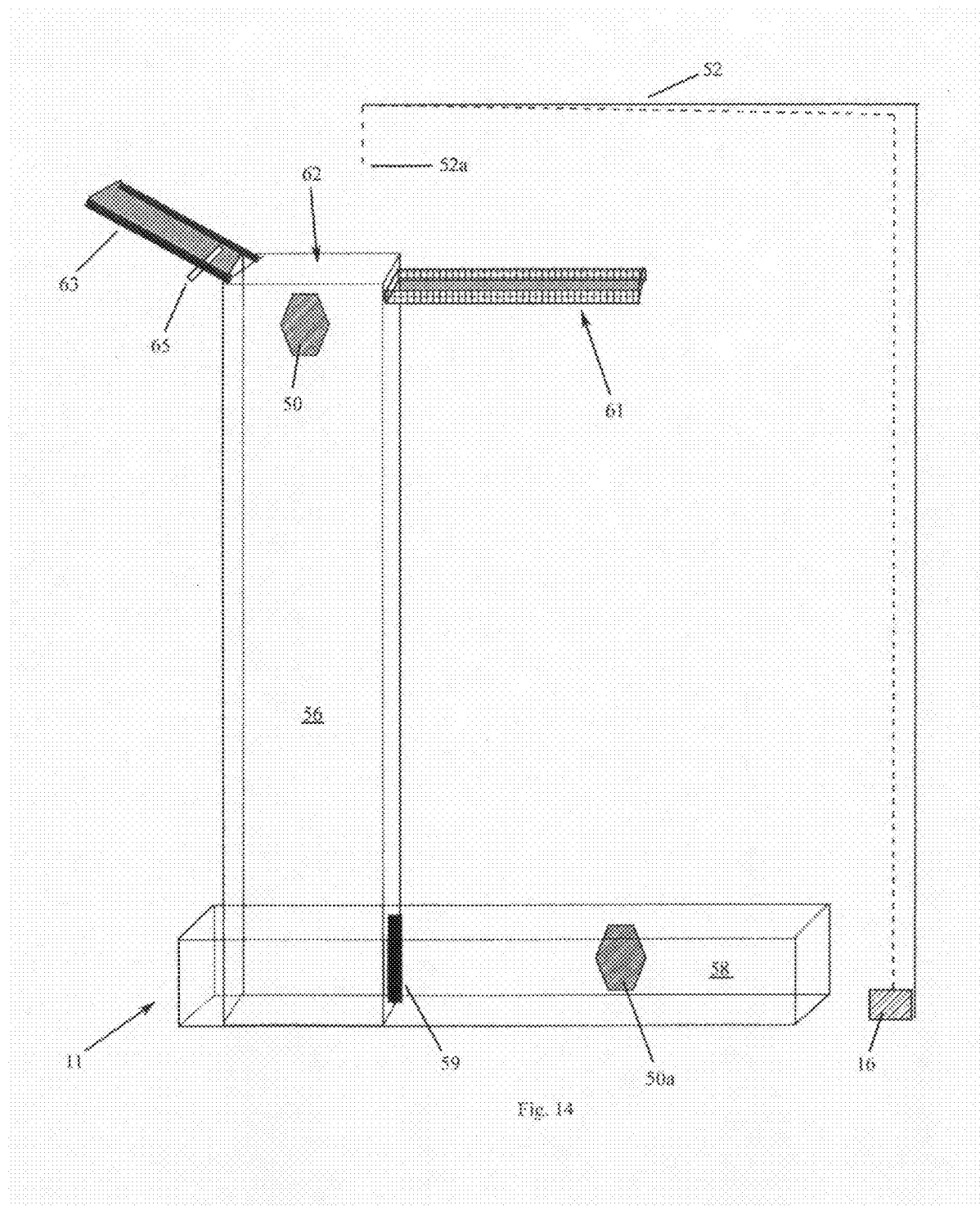
Figure 15:
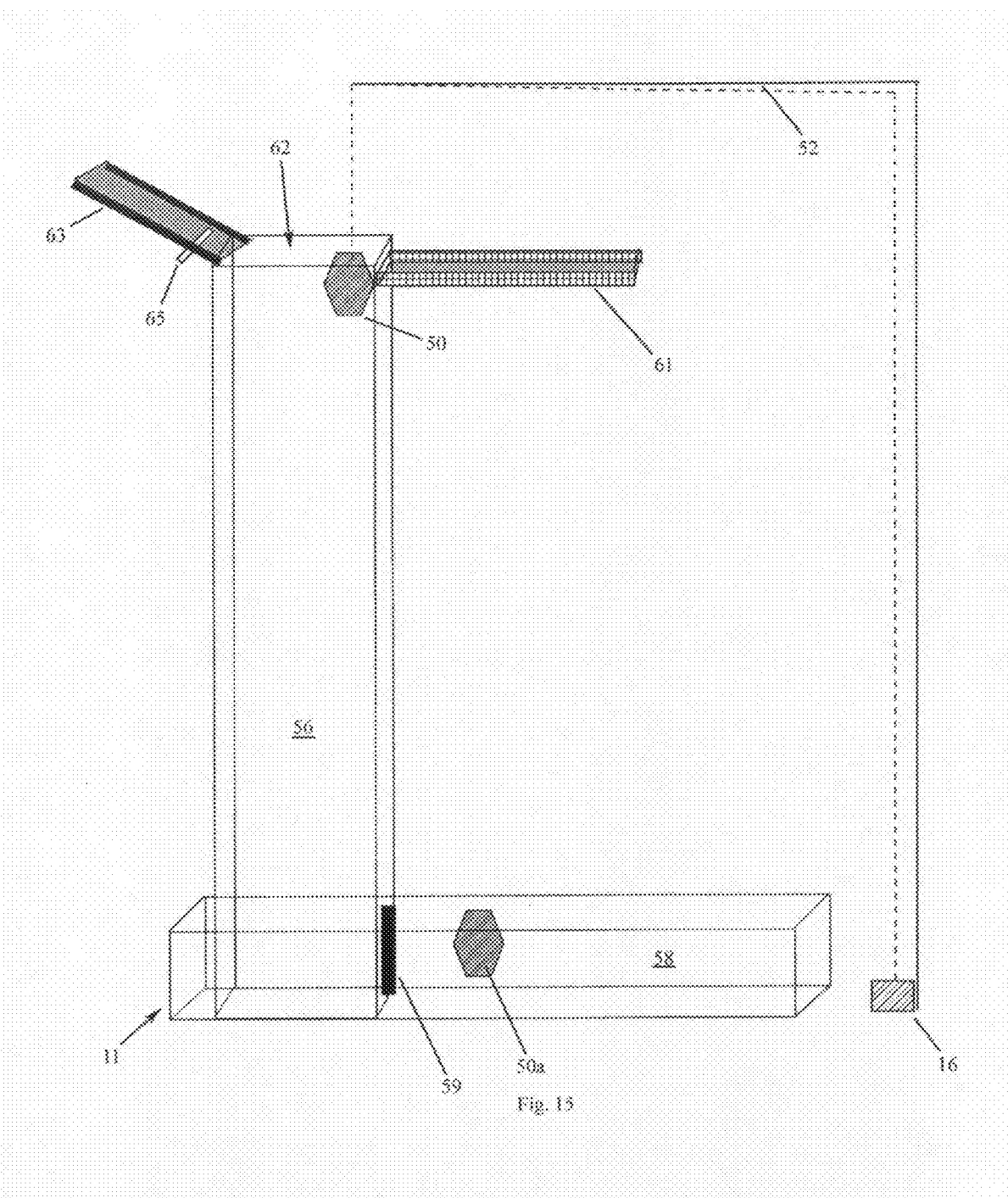
Figure 16:
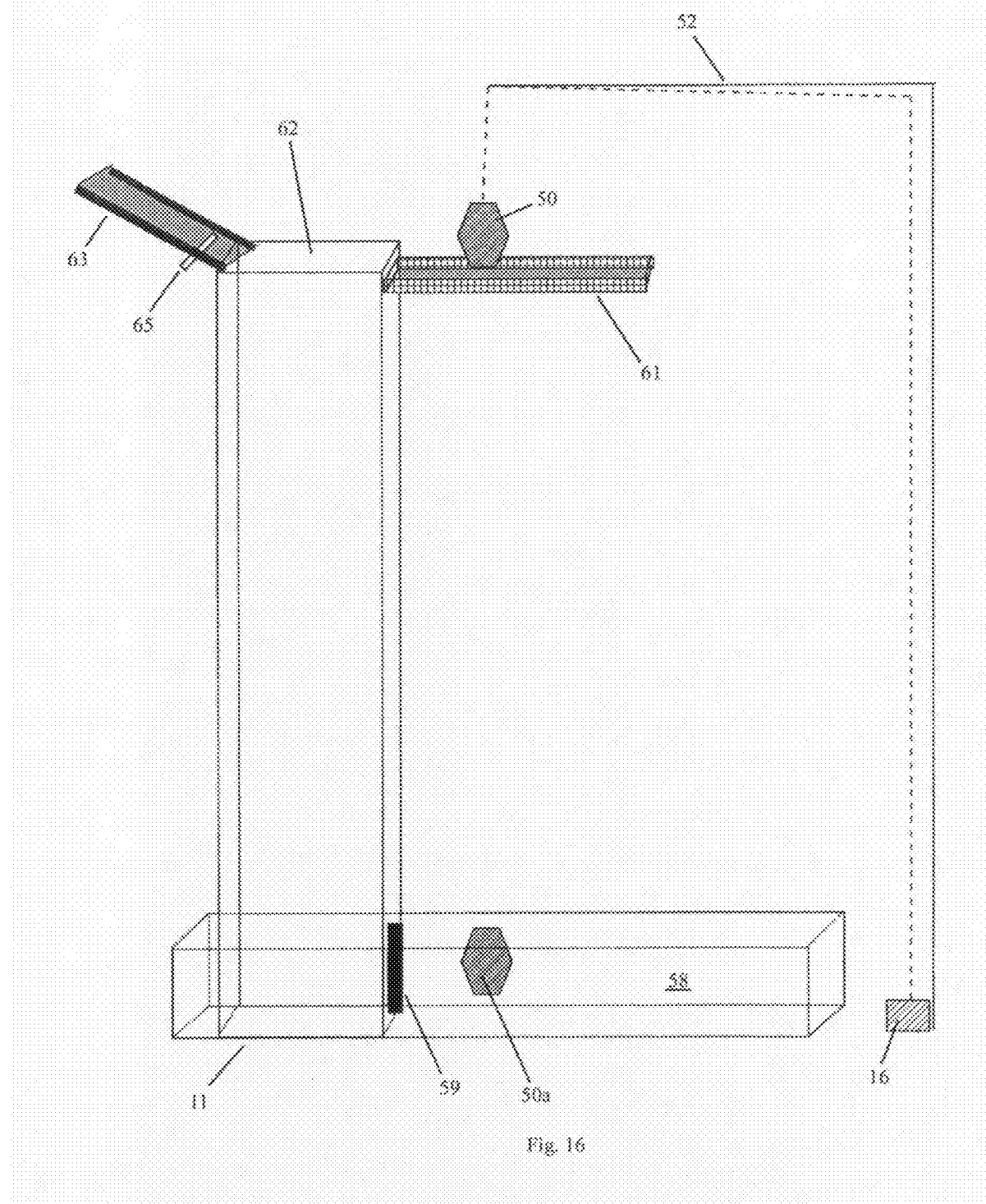

Looking to FIG. 11, the inlet portal 60 is opened. The pressure from the outlet door 63 proximate outlet portal 62 being shut keeps the water from flowing out the inlet portal 60. The pool of water is above the level of the inlet portal 60 which keeps air from being able to get into the tank 11. When the inlet portal 60 is open as shown in FIG. 11, one of the positive buoyant masses 50 will be moved into the vertical tower 56 of the water tank 11. In one embodiment, this will be performed manually. That is, the masses 50 would drop from a short height, giving it enough motion to dive under water and be pushed off a bar that moved it into the tank 11. In another embodiment, the other design was to use a mechanism to push the apparatus 10 forward and at the same time would slide the apparatus 10 down under a bracket. In a further embodiment, the first mass/air tank 50 may be placed in a first position, and when the second mass 50a is dropped, it would knock the first mass into the water tank 11. However, it is foreseen that the masses and air tank unit 50 may be pushed at one time with a plunger system attached to a motor. More than one mass 50 can be placed in the vertical tower 56 of the water tank 11 at a time, but only one is shown in FIG. 12. When the positive buoyant mass 50 is placed in the vertical tower 56, it will begin to rise as shown in FIG. 13. The inlet portal 60 is shut at this time, either manually by the user or with a small motor (not illustrated) that is activated after the air tank and mass 50 has been moved out of the portal. This also used a trigger system.) When the mass 50 reaches the upper level X2, the outlet portal 62 will be opened after the pressure valve is opened. The pressure valve released the pressure of the water created when the inlet portal 60 was opened. The positive buoyant mass 50 is now floating on top of the water in the vertical tower 56 of the water tank 11 (see FIG. 14). Looking to FIG. 15, the hook and rope 52 are lowered and connected to the mass 50. The mass 50 is moved out of the water and placed on the platform 61 for storage of its associated energy (FIG. 16).

Figure 17:
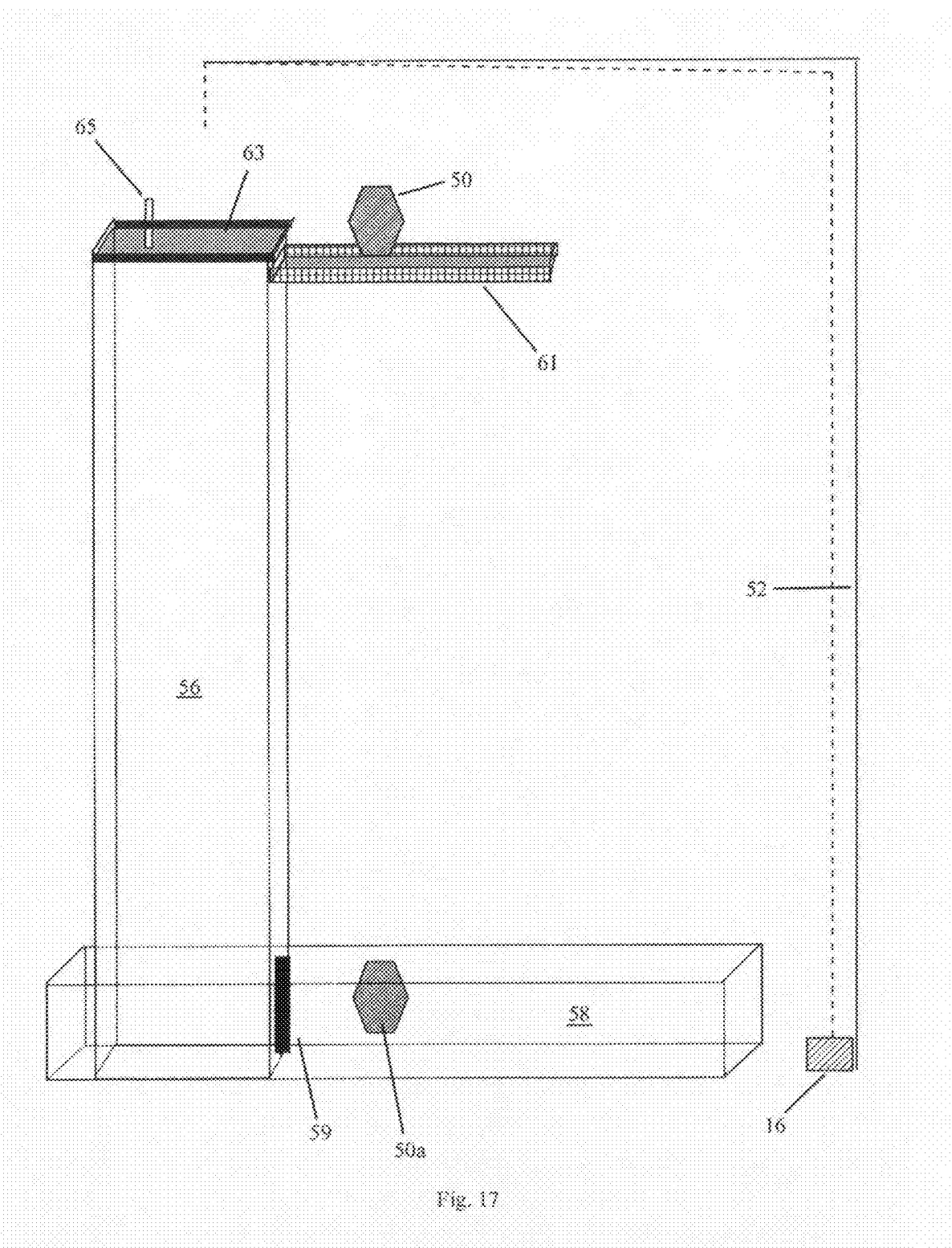
Figure 18:
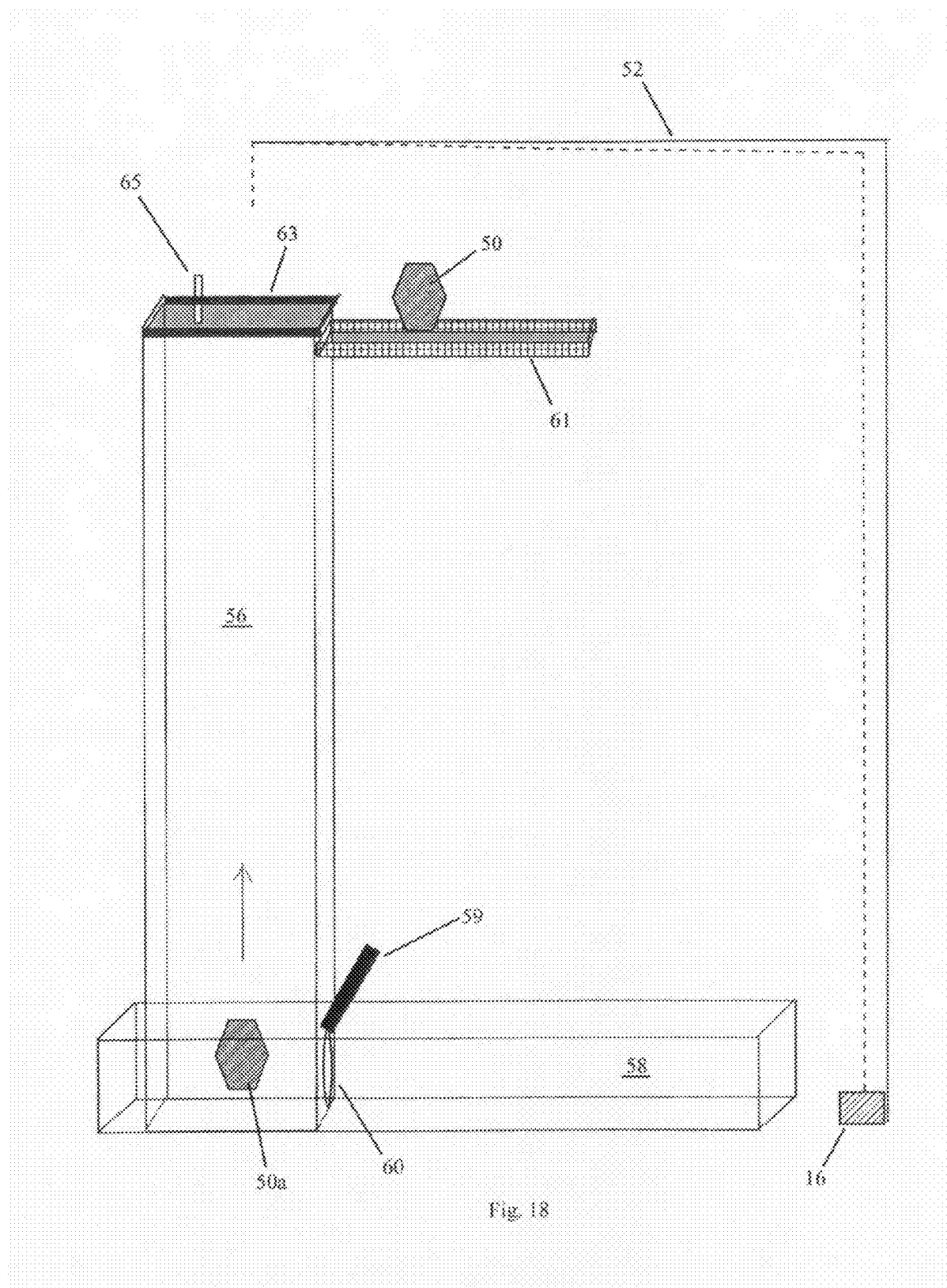
Figure 19:
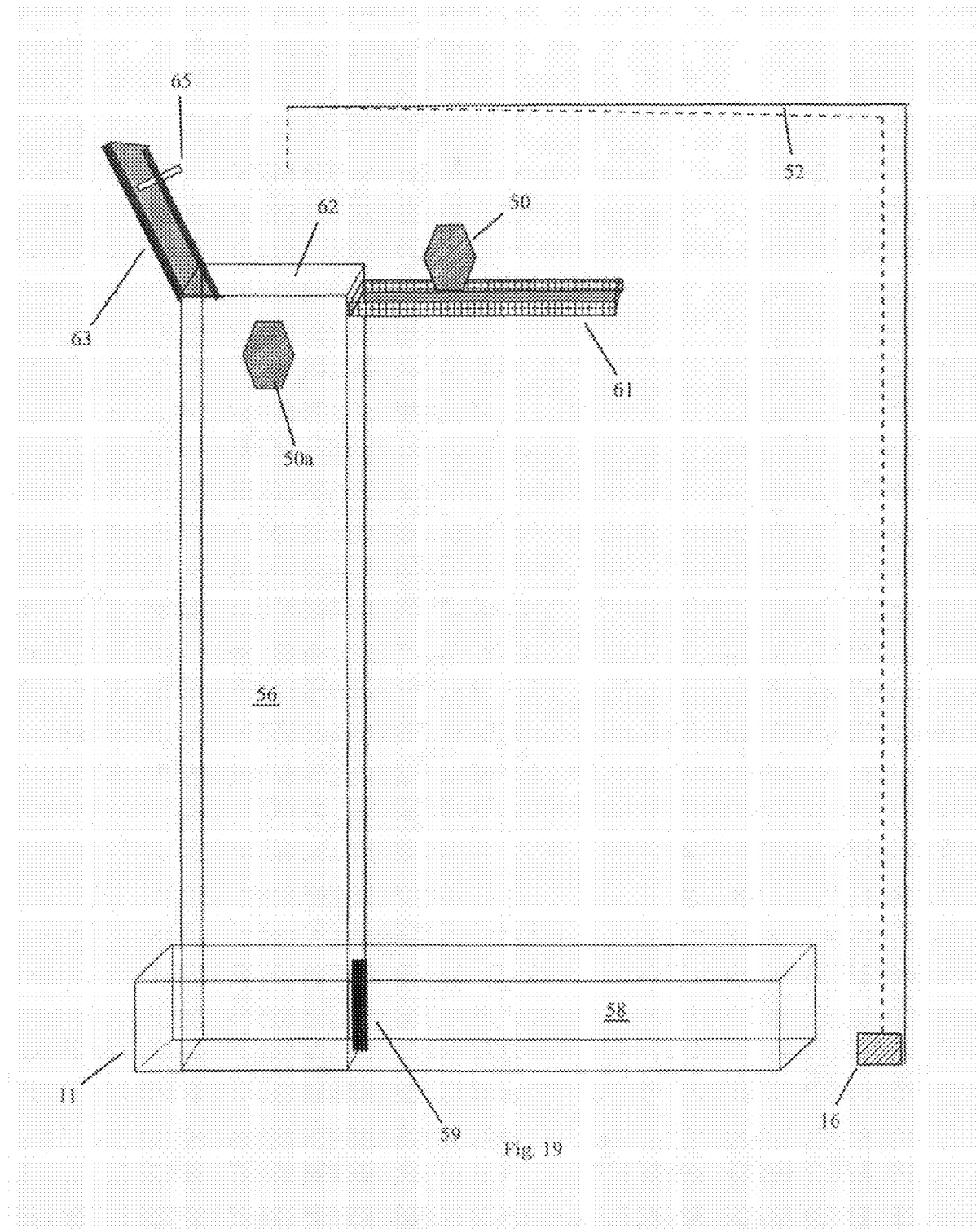
Figure 20:
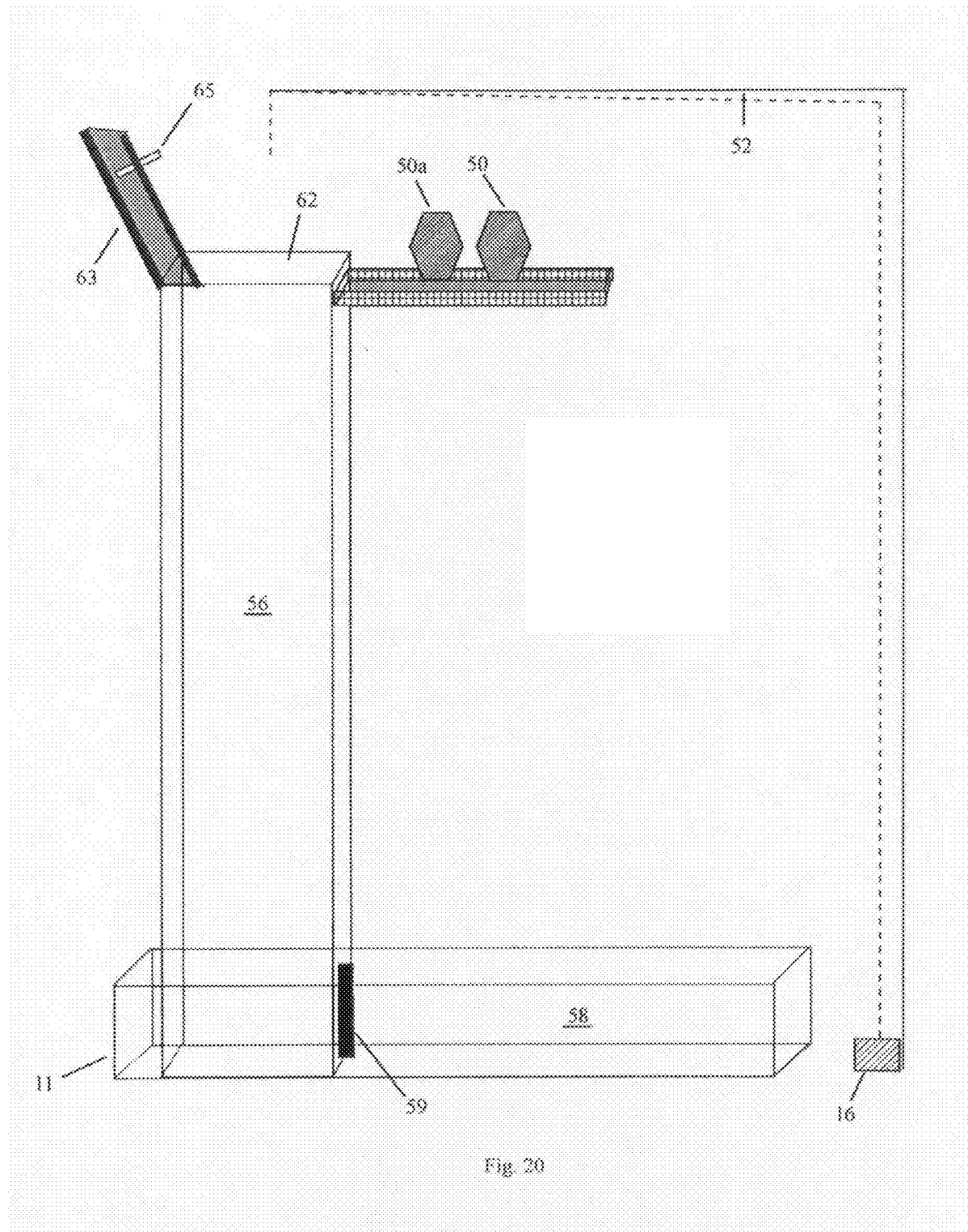
Figure 21:
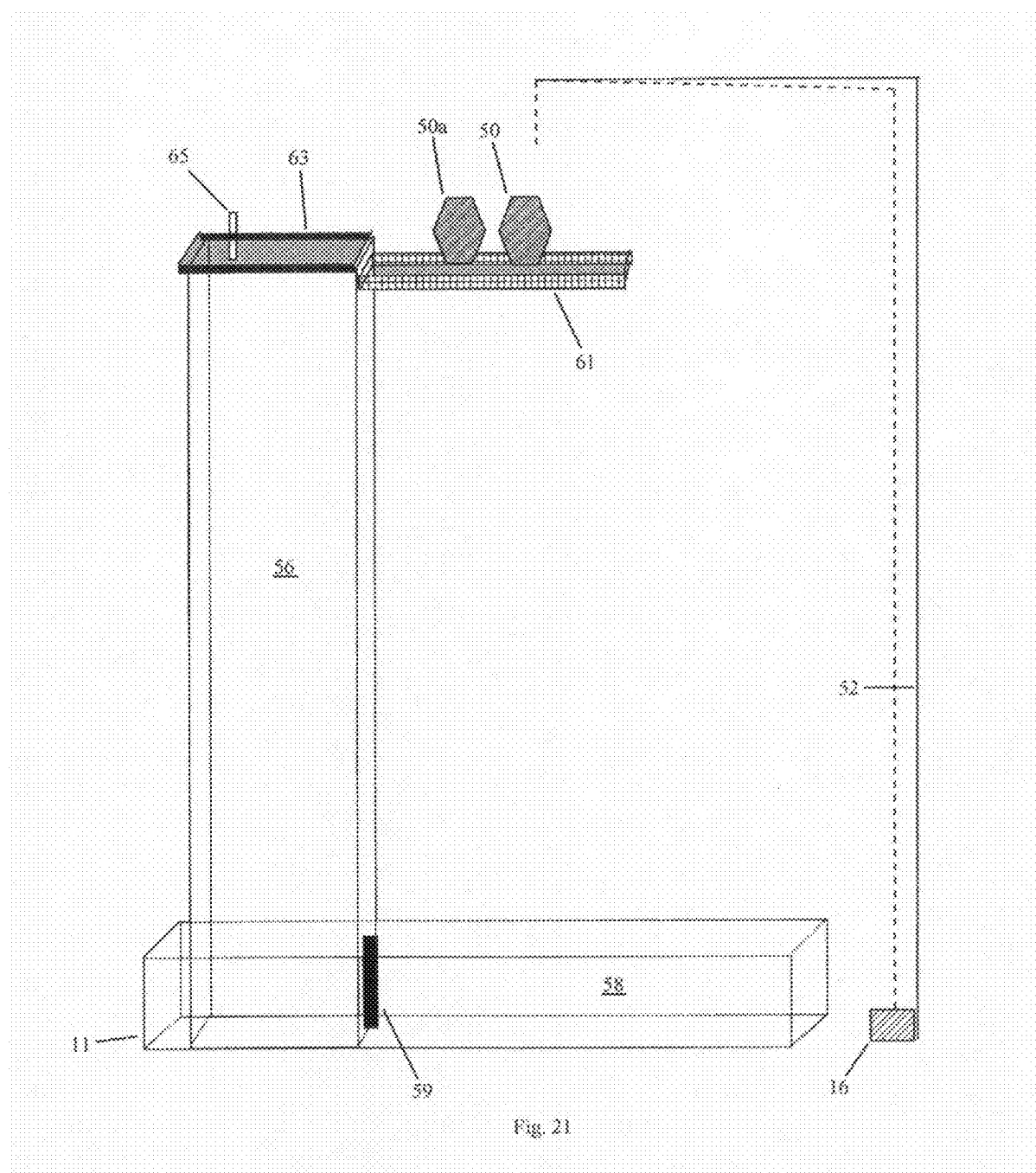
Figure 22:
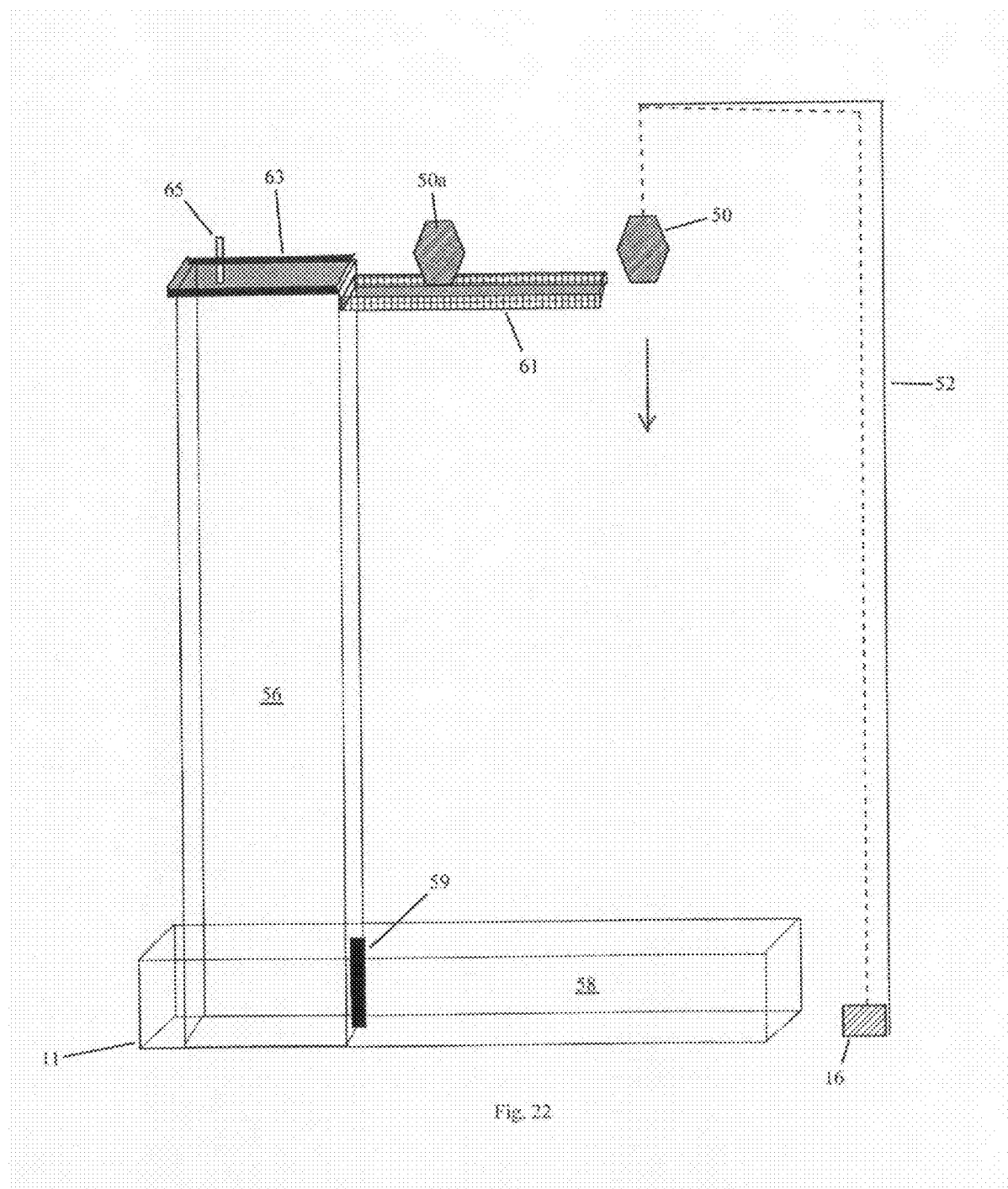
Figure 23:
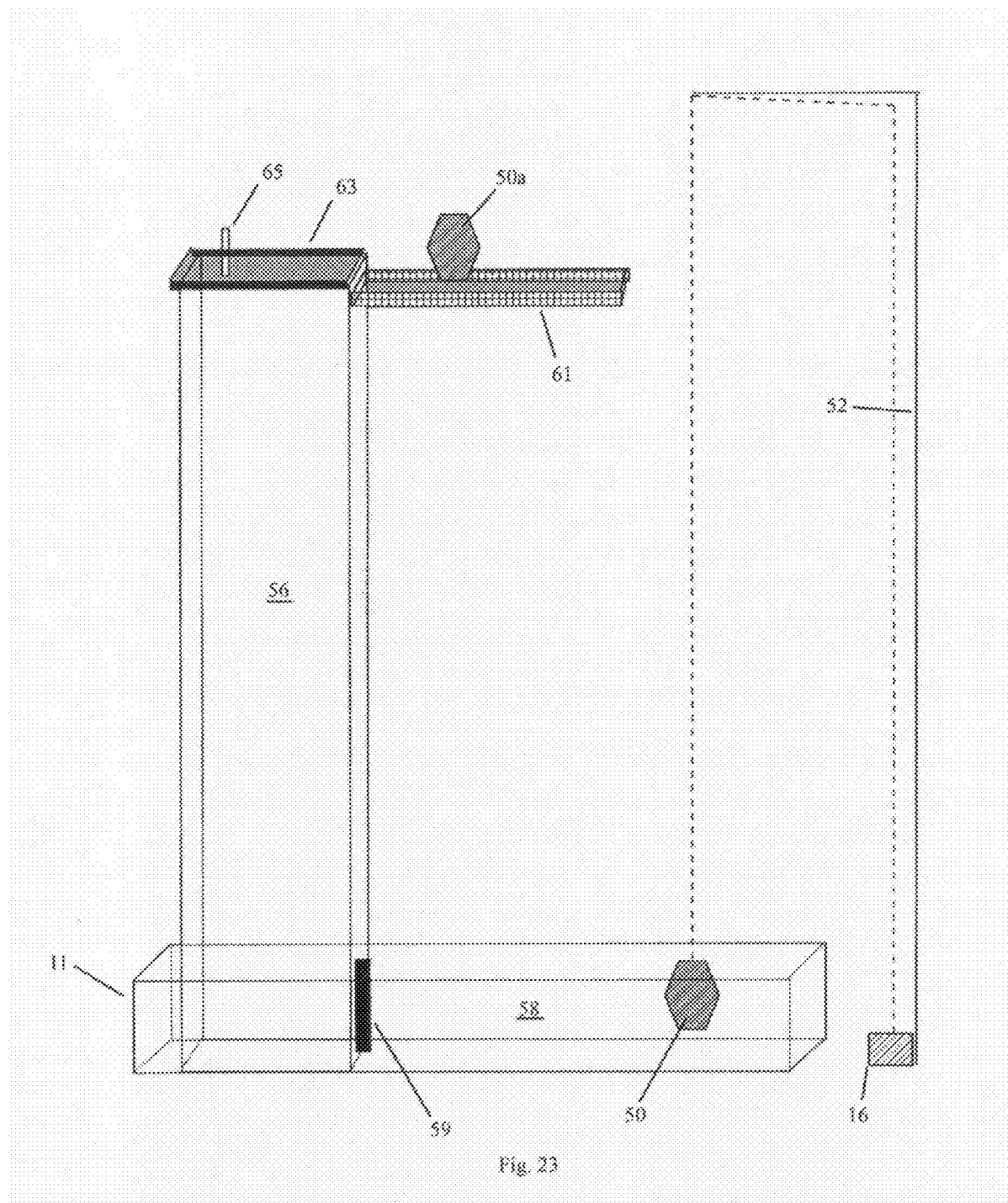
Figure 24:
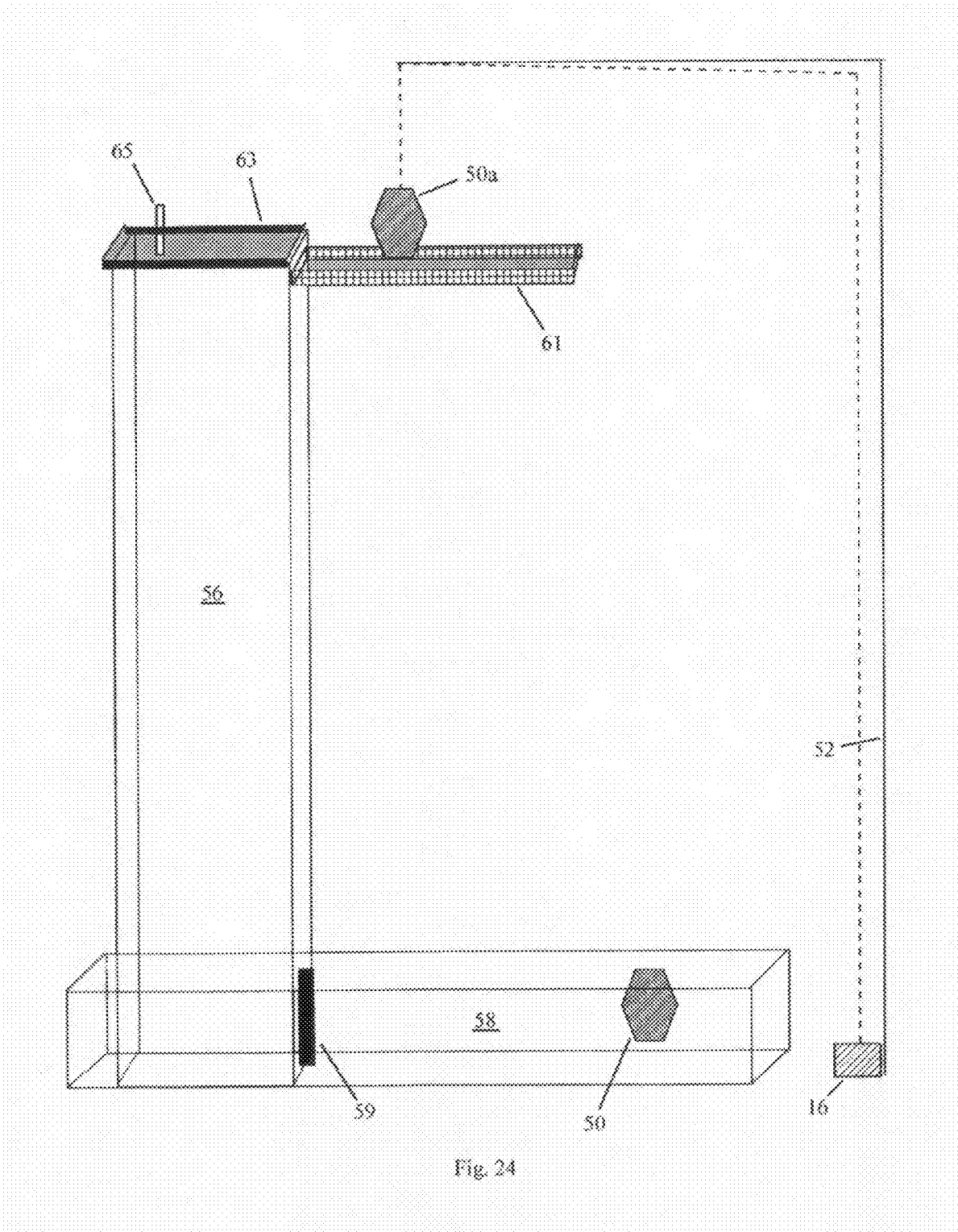
Figure 25:
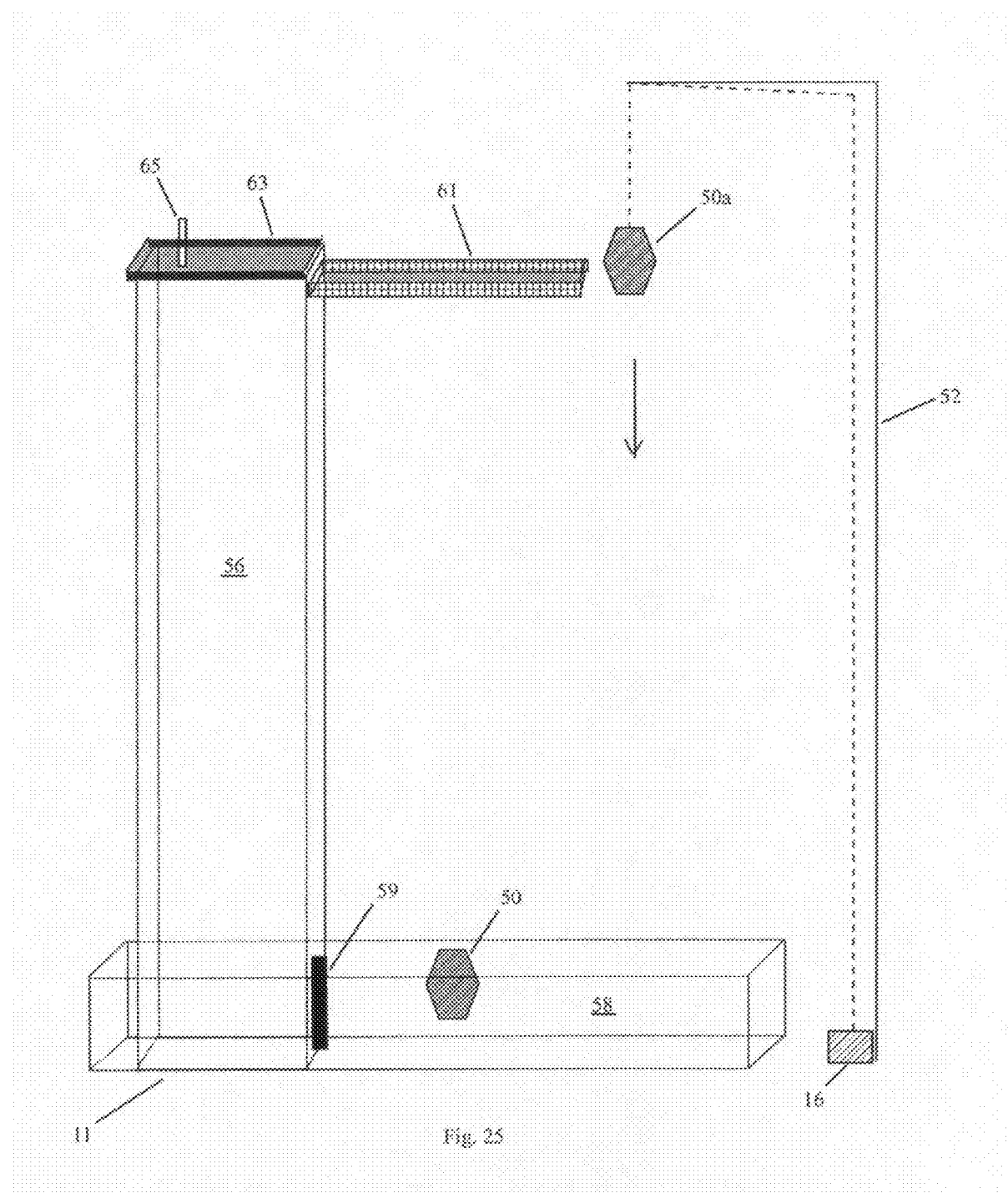
Figure 26:
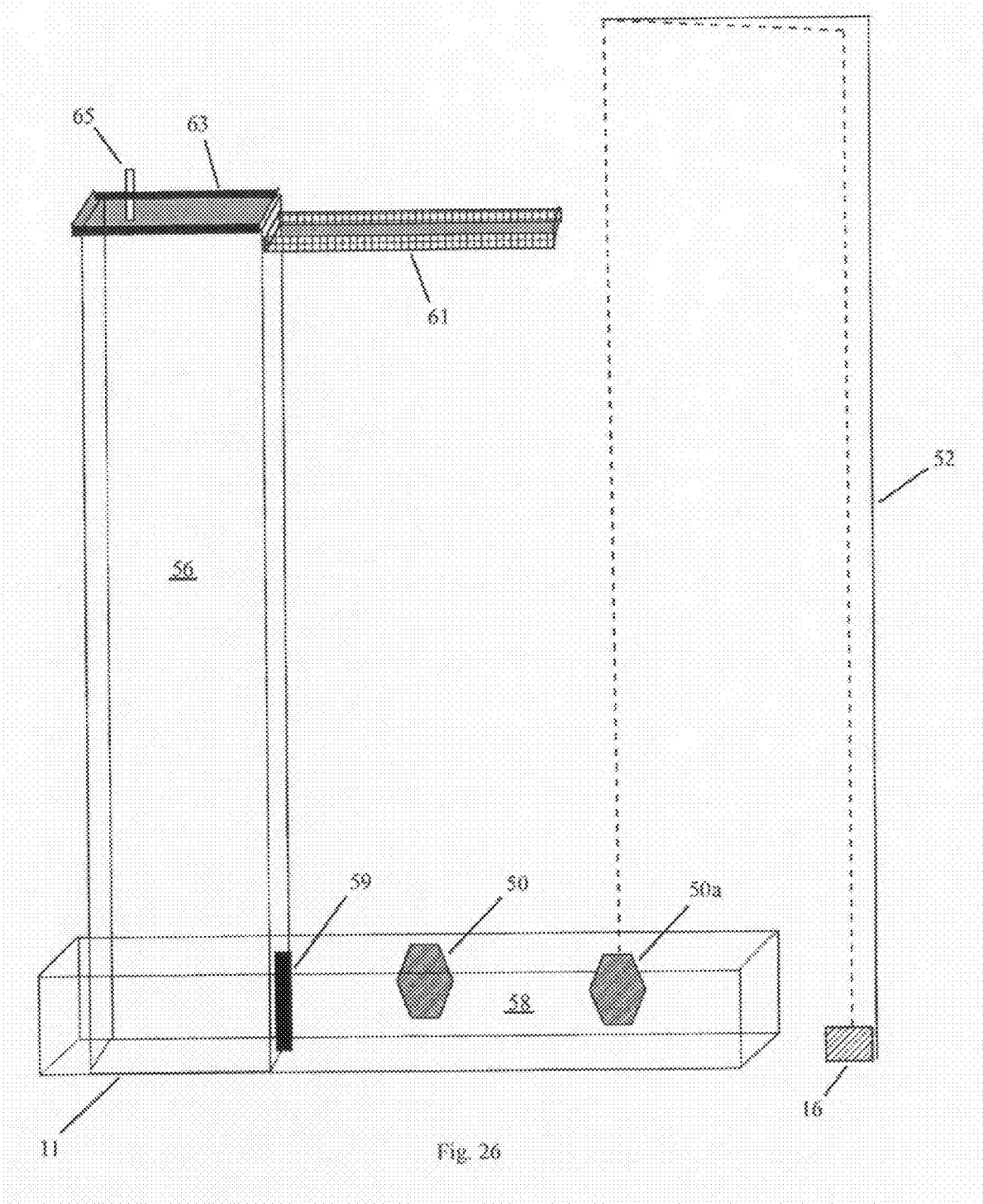
Figure 27:
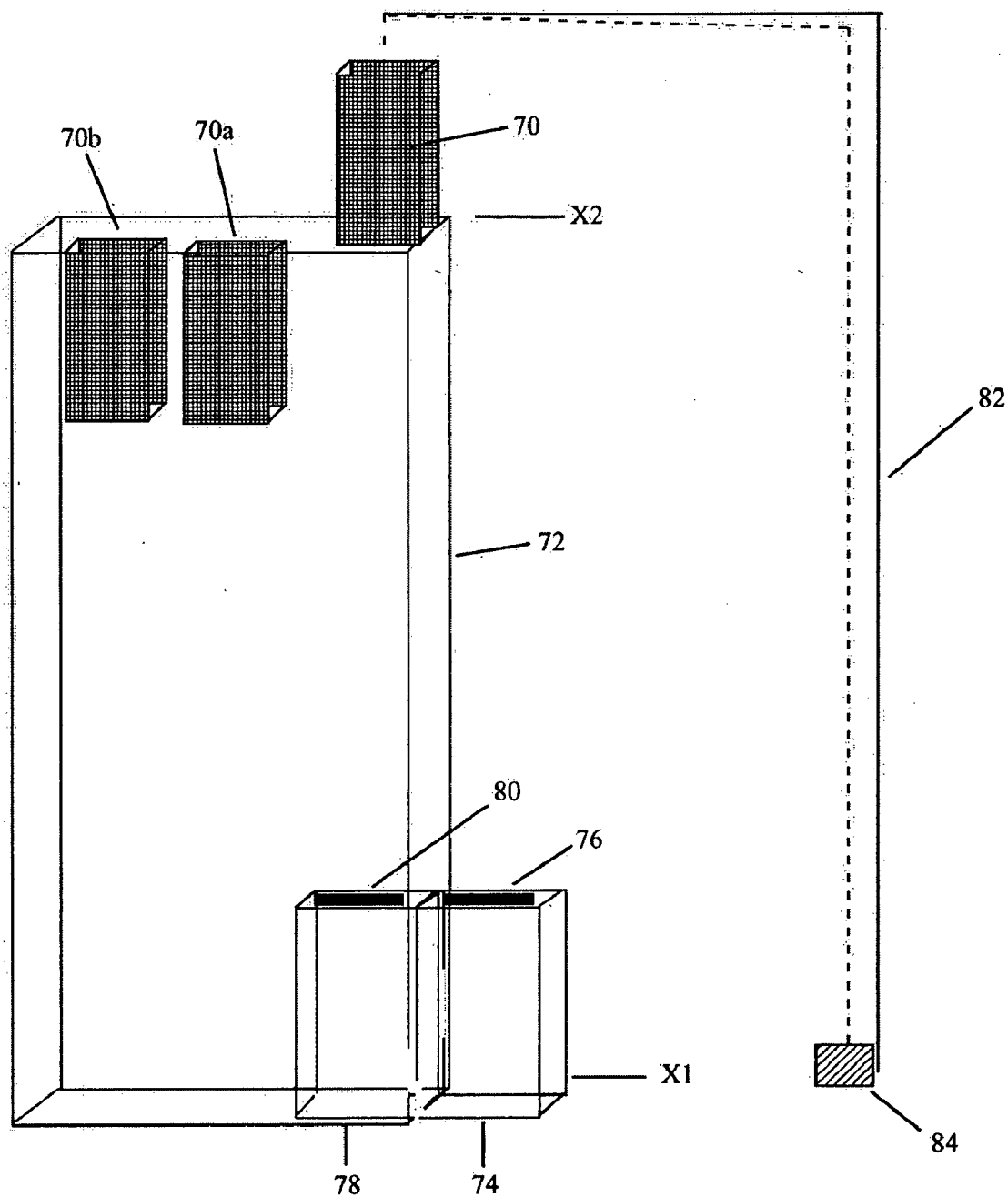
FIGS. 27 through 35 are side elevational views of another embodiment of a system employing an buoyancy vehicle apparatus.
Figure 28:
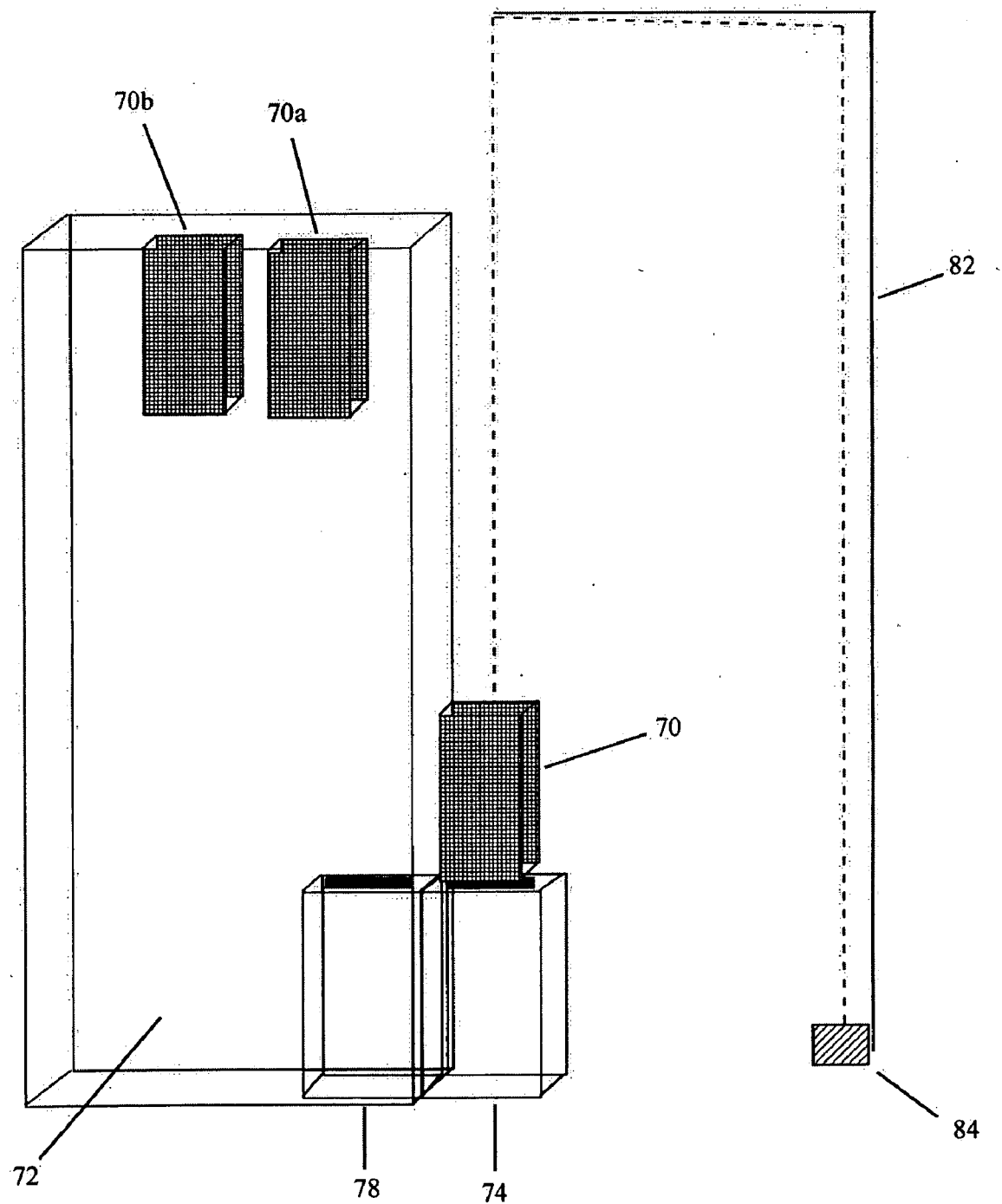
Figure 29:
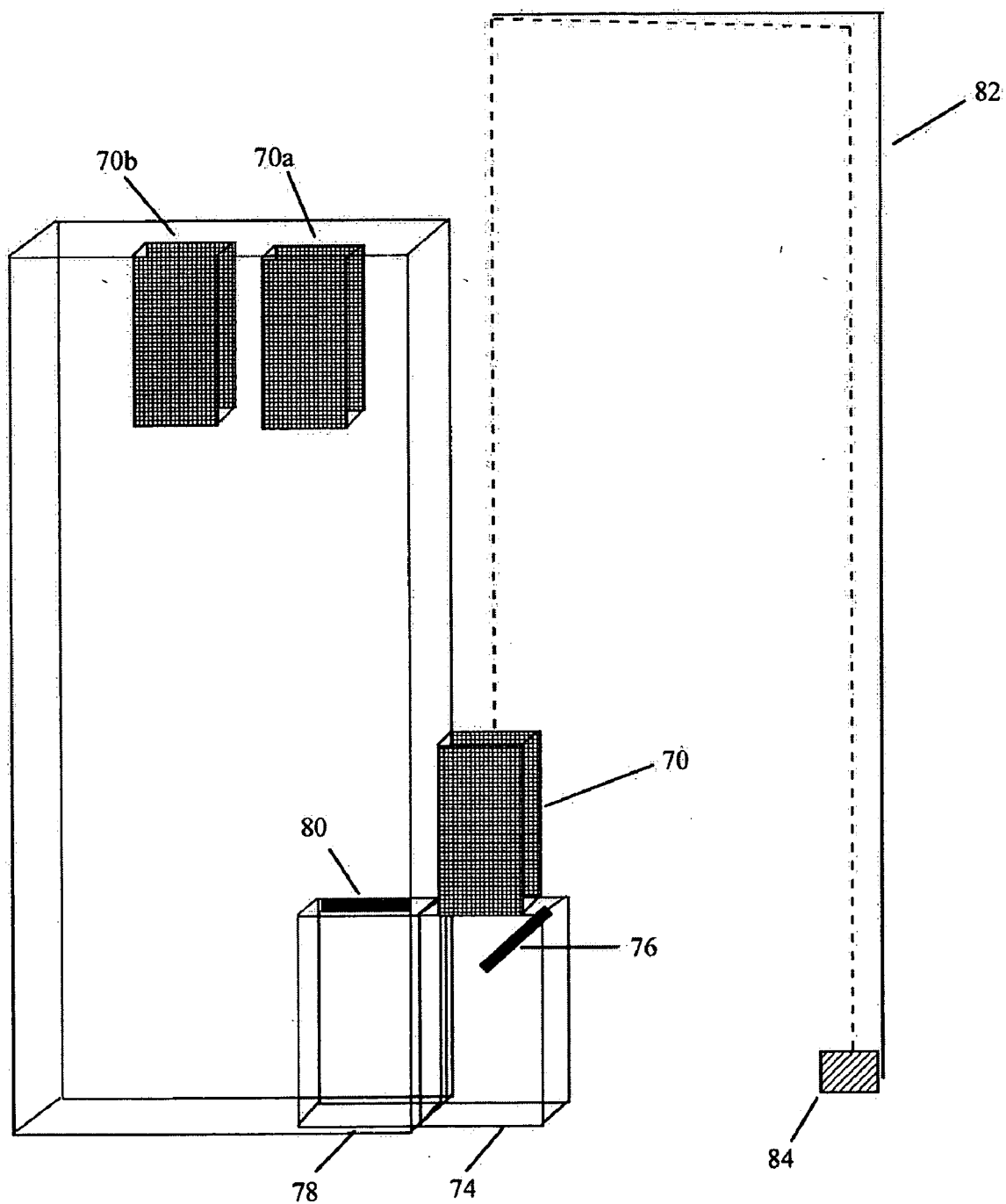
Figure 30:
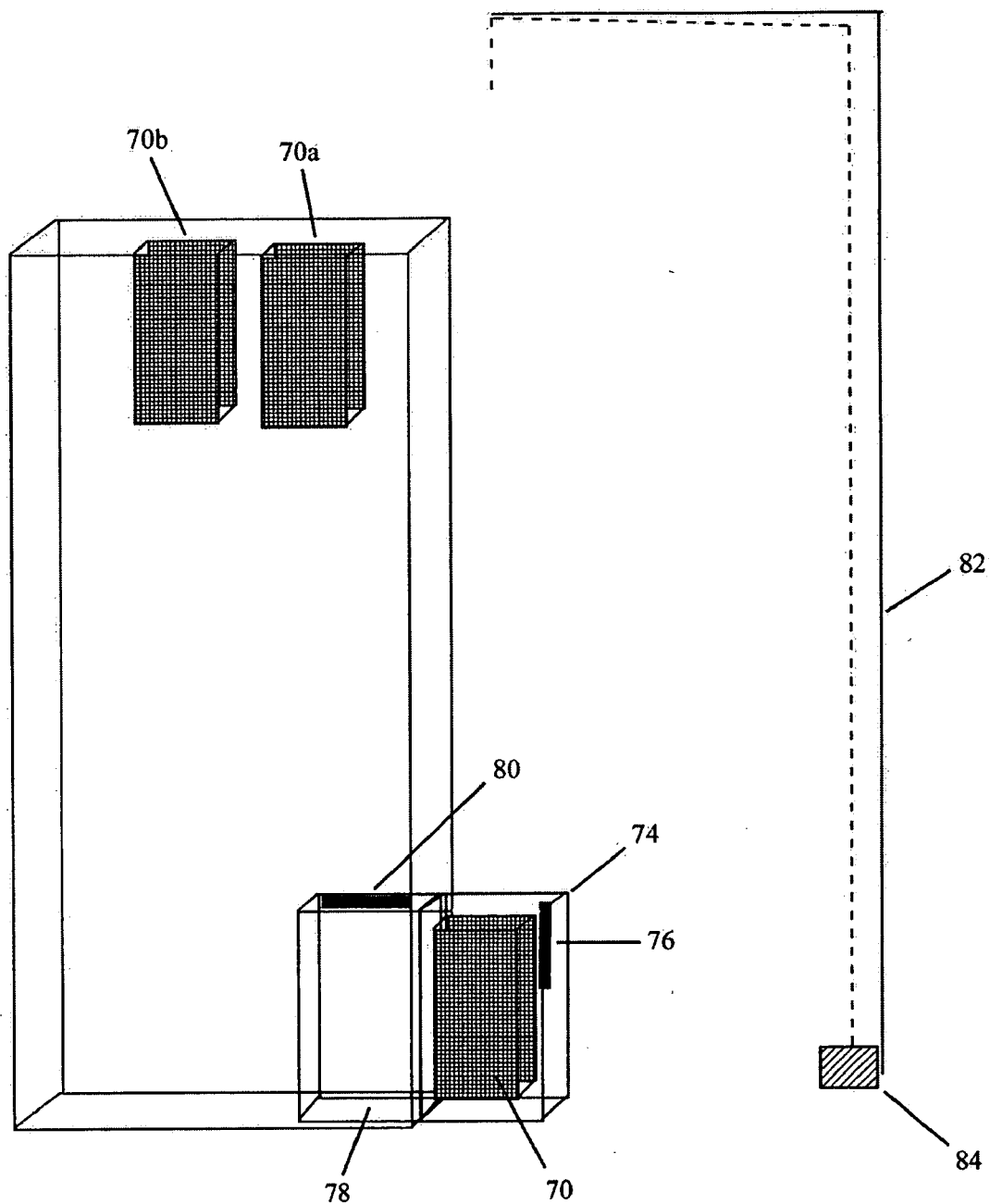
Figure 31:
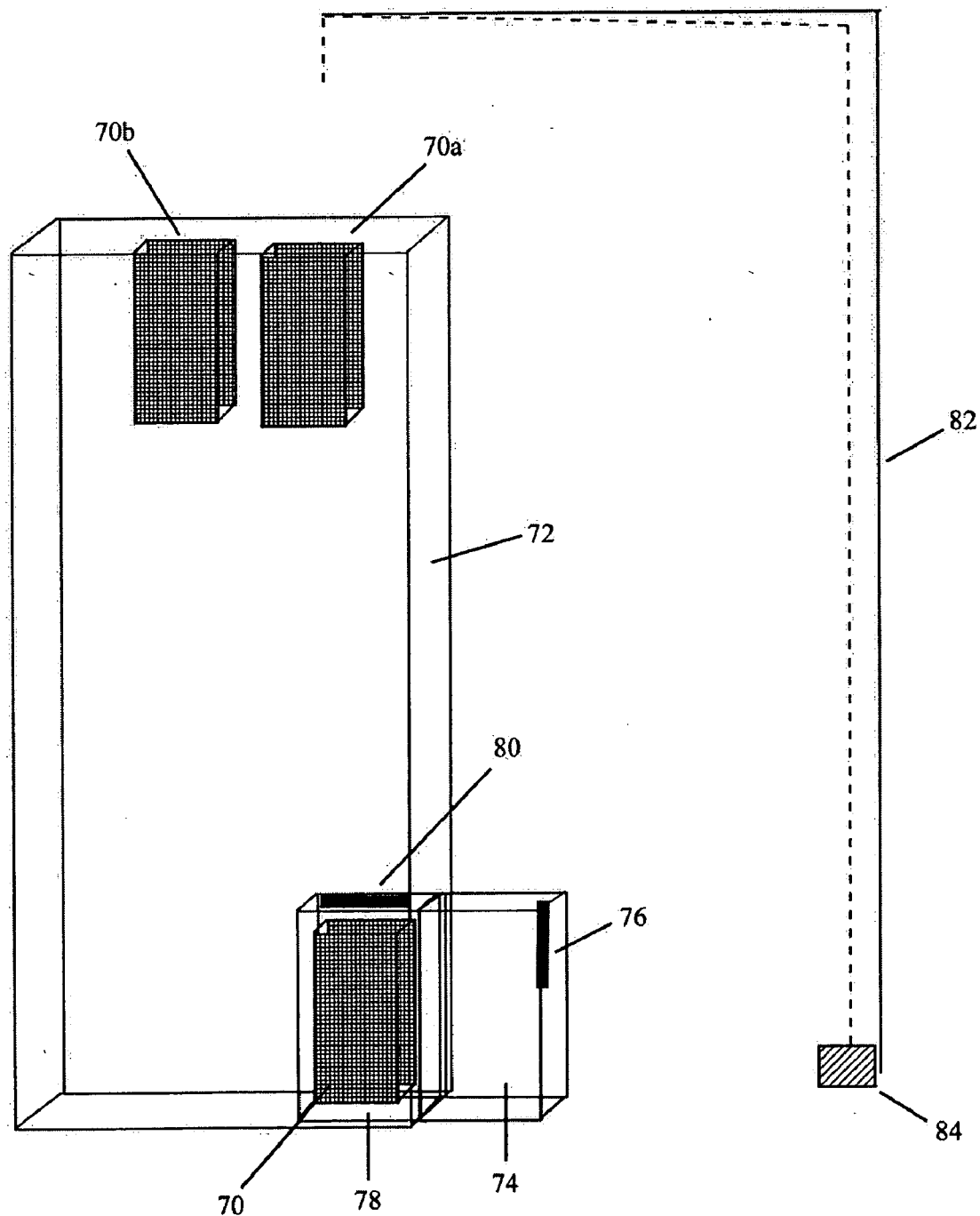
Figure 32:
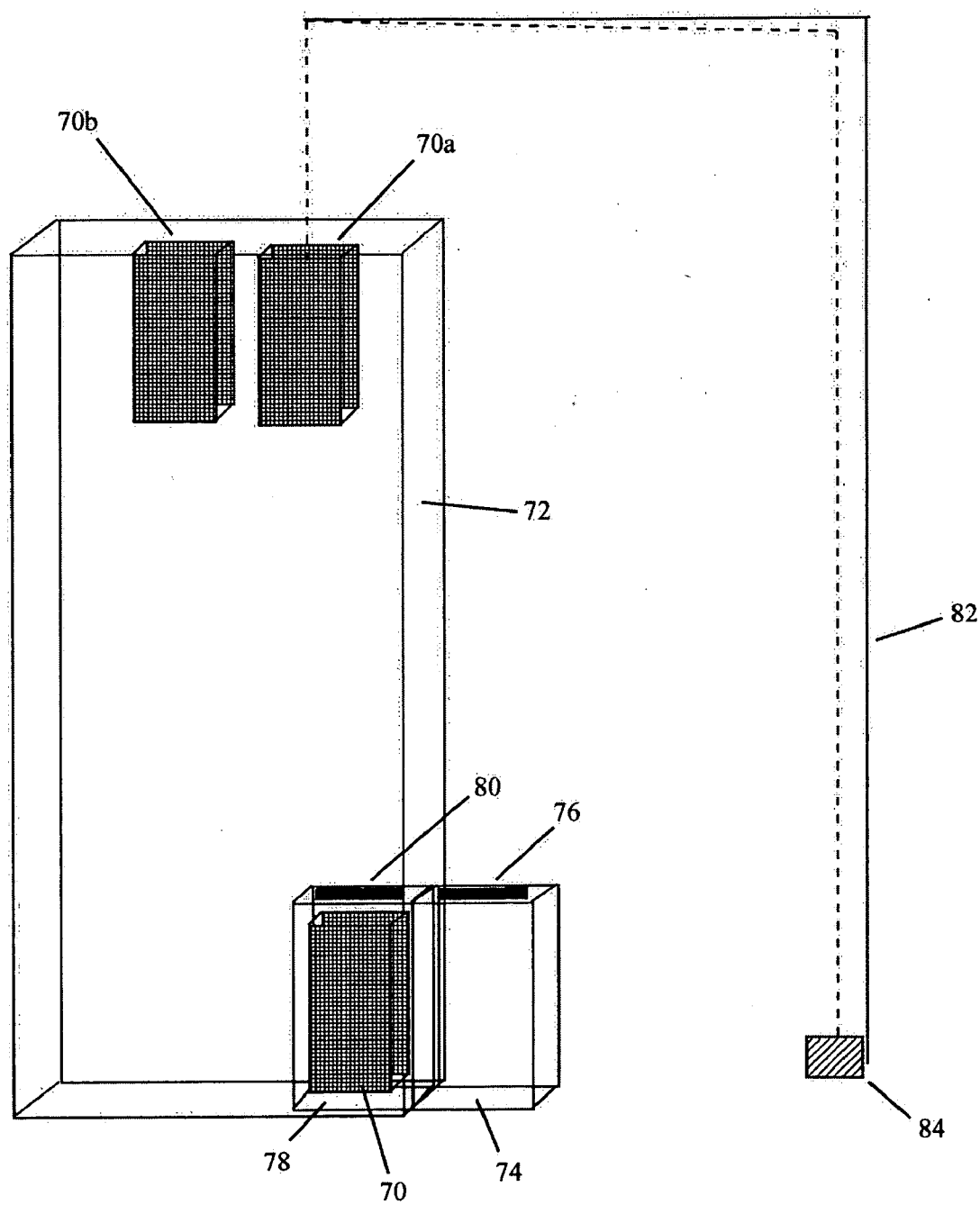
Figure 33:
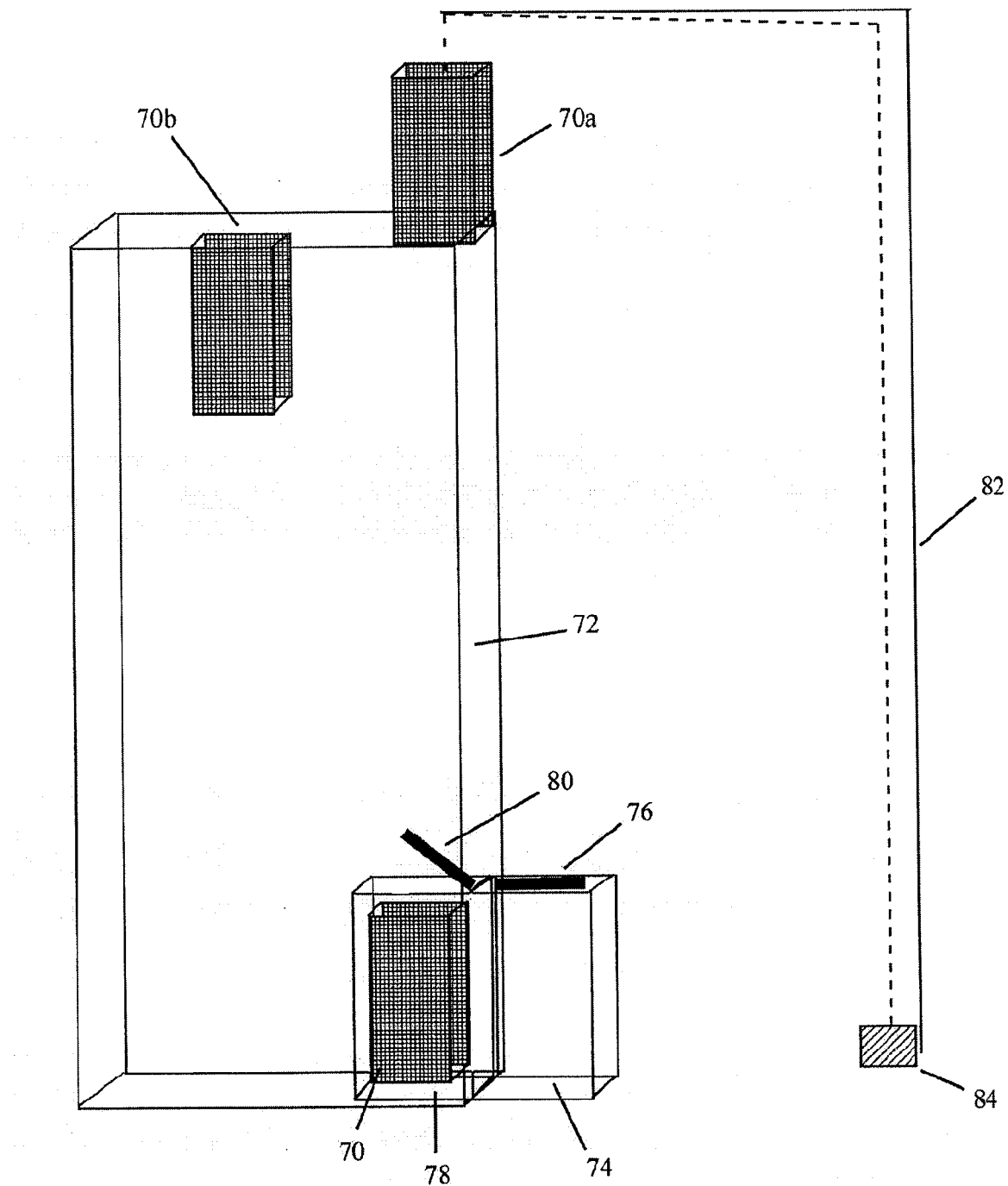
Figure 34:
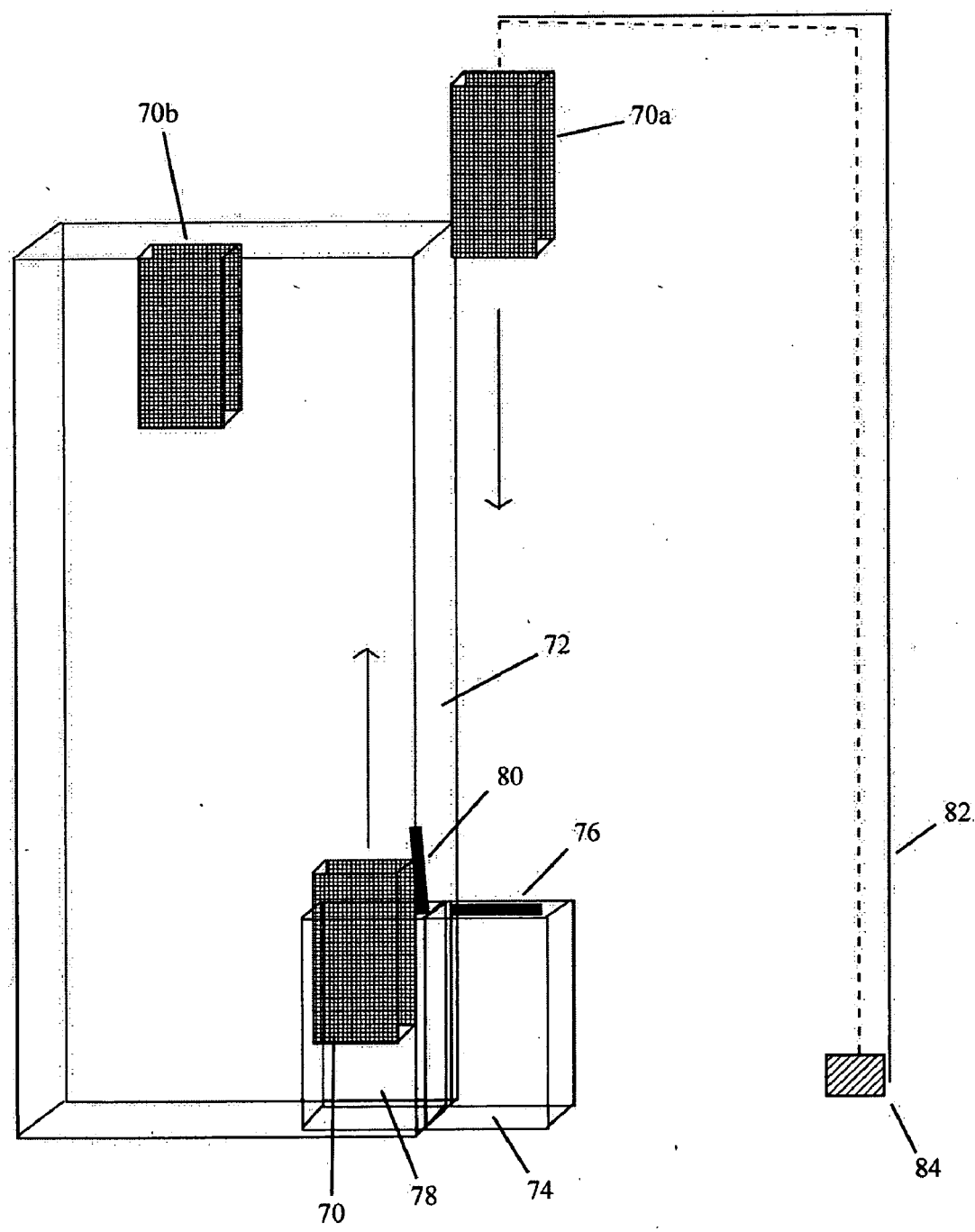
Figure 35:
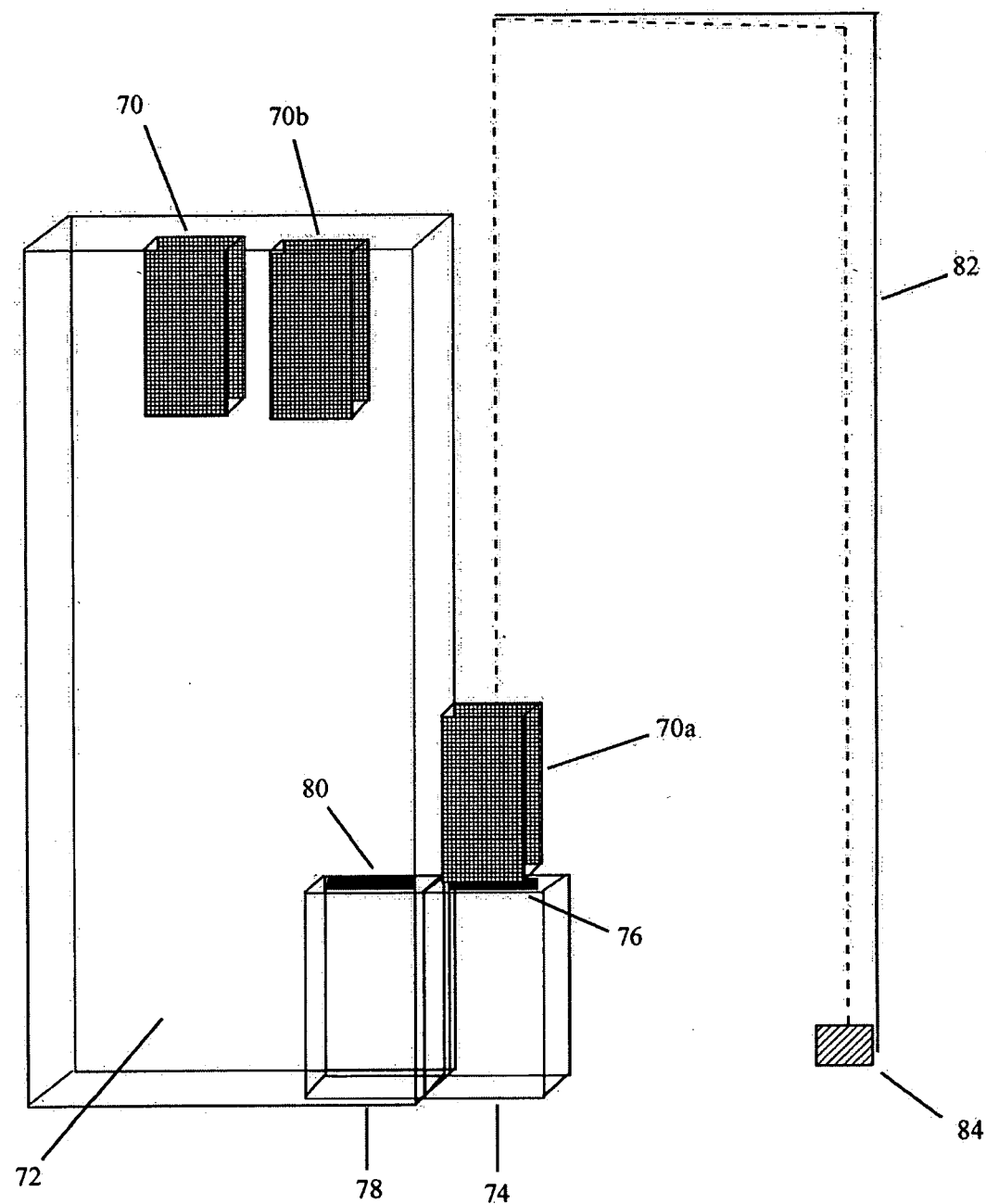

Referring to FIG. 17, the outlet portal 62 is closed. The hook is disconnected from the mass 50, and a second mass 50a will now be transported to the platform 61 for storage. Looking to FIG. 18, the inlet portal 60 is opened and the mass 50a is placed within the vertical tower 56 of the water tank 11 as was done for the first mass 50. When the second mass 50a is placed in the vertical tower 56 of the water tank 11, it will begin to ascend from the first level X1 to the second level X2. Once the second mass 50a has reached the top of the vertical tower 56 of the water tank 11 as shown in FIG. 19, the outlet portal 62 will be opened after the inlet portal 60 is closed. This step is the same as was done for the first mass 50. The second mass 50a is moved to the platform 61 by connecting the hook and rope, and the second mass 50a is the then stored on the platform 61 as shown in FIG. 20. This process can be repeated as many times as necessary with any number of masses 50 to store the desired amount of energy on the platform 61. The outlet portal 62 is closed and the energy stored (see FIG. 21). The energy can be stored for an indefinite period of time without any loss of energy.

The next phase of the process of generating electricity will show discharge of the stored energy. If the system is being used to lift materials 50, then the system would repeat the steps at the beginning at this point and continue to lift the materials 50 needed. To discharge the energy, a mass 50 is connected to the hook and maneuvered over the edge of the platform 61 and allowed to fall from the higher level X2 to the lower level X1 (see FIG. 22). As the mass 50 free falls from the edge, it will concomitantly draw one end of the rope 52. As the first end of the rope 52 is pulled in a first direction, the rope 52 will spin the generator 16 to produce electricity (see FIG. 23). The first mass 50 will eventually land in the horizontal base pool 58 of the water tank 11, at which time the hook and rope 52 are disconnected from the mass 50 (see FIG. 24).

The rope 52 is retracted, either manually or using a counter weight system. That is, counter weights may be affixed to the rope 52 that weigh less than the mass 50. Thus, the counter weights will rise when the masses 50 are placed on the rope 52 and fall from level X2 to X1, but the counter weights will fall (and thus recoil the rope 52) when the mass was released. with the first end being connected via a hook or similar means to the second mass 50a that remains on the platform 61 (see FIGS. 25 and 26). The second mass 50a is maneuvered over the edge of the platform 61 and allowed to free fall just as the first mass 50 did, thereby again generating electricity at the generator 16 using the force of the fall (see FIG. 26). The second mass 50a will then be at the ground level X1 with the first mass 50, the energy will have been dispensed. This process can be repeated until all the masses 50 have been lowered from the platform 61 to ground level X1. Energy can be stored again by allowing the masses 50 to rise in the vertical tower 56 of the water tank 11.

An example of how efficient the present system is over other bulk energy storage systems is provided. If the present system were to lift 100 units of a metal (e.g., lead), with each unit being 1 cubic foot in volume to a height of 10 m (~30 ft), then the energy stored would be 3.2 MW of potential energy to be released. The storage facility would be 30 ft tall with 100 square feet of space (approx a small parking garage) to store the masses. In order to store the same amount of energy using water it would require 12 times the area and a larger drop than 30 ft (usually 100 ft at a minimum). By lifting heavy objects to heights above the ground, the present apparatus 10 can store large quantities of energy for later consumption.

A further embodiment of the previous system is illustrated in FIGS. 27 through 35. In this embodiment, one or more air tanks 70, such as a 5 kg mass, is held in a tank 72 filled with water or another liquid. The water tank 72 includes an exterior chamber 74 having a horizontal and pivotal exterior portal door 76 and an interior chamber 78 having a horizontal and interior portal door 80. The exterior chamber 74 abuts the interior chamber 78, with no wall separating the chambers 74, 78. Like the previous embodiments, a rope 82 is mounted proximate the water tank 72, with one end connected to a generator 84 and the opposite end detachably connectable to the air tanks 70.

In operation, the first air tank 70 floats to uppermost level X2 and to the side of the water tank 72 to be connected to the rope 82 and ready for descent to lower level X1. This step consumes energy. The air tank 70 has to be lifted 1 ft (0.3 m) out of the water and moved horizontally to the edge of the water tank 72. The air tank 70 is allowed to free fall. The mass of the air tank 70 spins the generator 84, which thereby produces electricity. The next few steps consume electricity, for example, the opening and closing of the exterior portal door 76 and the air tank 70 dropping into the exterior portal 74. Since the air tank 70 weighs 5 kg, it opens the exterior portal door 76 easily (see FIGS. 29 and 30). After the exterior door 76 is opened, the air tank 70 is dropped into the exterior portal 74. The air tank 70 is moved into the interior portal 78 and ready to rise in the water tank 72 when the interior portal door 80 is opened. The air tank 70 is moved 1 ft horizontally. The exterior and interior portals 74, 78 are filled with water, such that the air tank 70 moves easily from the interior portal 74 into the water tank 72. While the air tank 70 in the exterior portal 74 is moved into position in the interior portal 78, the rope 82 and hook are detached from the first air tank 70 to be connected to the next air tank 70a. Currently, the next air tank 70a is connected to the hook manually, although it is foreseeable that an automated connection could be implemented.

The interior door 80 is opened to allow the air tank 70 to ascend to the top of the water tank 72. As the second air tank 70a is allowed to drop, the first air tank 70 is ascending from the bottom of the water tank 72 (see FIGS. 34-35). Thus, the second air tank 70a descends as the first air tank 70 ascends from the bottom of the water tank 72. There is no energy produced or consumed for the first air tank 70 at this step. The cycle has completed with the second air tank 70a descending and the closing of the interior portal door 80.

A simple test of this embodiment was performed using a 6 ft water tank. This could have easily been doubled (e.g., using a 10 kg air tank 70), producing twice as much electricity and consuming only a small increase in energy. Although this has been demonstrated on a small water tank 72, there is no reason that the system can not be enlarged to 10 ft (3 m) or even 30 ft (10 m).

This embodiment could employ multiple portals to allow multiple generators 74 to be connected to air tanks 70 at the same time. In addition, larger masses 70 can be lifted as the diameter of the water tank 72 is extended, thereby creating proportionately greater amounts of electricity.

Having thus described exemplary embodiments of a BUOYANCY VEHICLE APPARATUS TO CREATE ELECTRICAL POWER, it should be noted by those skilled in the art that the within disclosures are exemplary only and that various other alternatives, adaptations, and modifications may be made within the scope of the present invention. Accordingly, the invention is not limited to the specific embodiments as illustrated herein, but is only limited by the following claims.

What is claimed is:

1. An apparatus for creating electrical power through interaction with a fluid between a first level and a second level, said apparatus comprising:
   a substantially hollow housing having an upper surface and a lower surface, said housing defining a water port in the lower surface;
   a generator affixed to the housing;
   means for driving said generator as said housing travels in the fluid between the first level and the second level, said driving means surrounded by the fluid connected to said generator; and
   an air supply in communication with upper surface of the housing to selectively force air into said housing to selectively change the buoyancy of said apparatus in the fluid, wherein said air supply comprises an air compressor or other compressed gases.

2. The apparatus as described in claim 1, further comprising at least one air release valve connected to the upper surface of the housing to release air from the housing.

3. The apparatus as described in claim 1, wherein said driving means comprises a propeller having a series of blades connected to an axle, said axle connected to said generator.

4. The apparatus as described in claim 1, wherein said driving means comprises a turbine connected to said generator.

* * * * *